United States Patent
Munroe et al.

(10) Patent No.: US 7,861,424 B2
(45) Date of Patent: Jan. 4, 2011

(54) PIPE LASER

(75) Inventors: Jay R. Munroe, Watseka, IL (US); John Davenport, Sheldon, IL (US); Duard Wilson, Kankakee, IL (US)

(73) Assignee: Robert Bosch Tool Corporation, Mount Prospect, IL (US)

( * ) Notice: Subject to any disclaimer, the term of this patent is extended or adjusted under 35 U.S.C. 154(b) by 496 days.

(21) Appl. No.: 11/979,950

(22) Filed: Nov. 9, 2007

(65) Prior Publication Data

US 2008/0120853 A1    May 29, 2008

Related U.S. Application Data

(60) Provisional application No. 60/865,592, filed on Nov. 13, 2006.

(51) Int. Cl.
*G01B 11/26* (2006.01)

(52) U.S. Cl. ............... 33/286; 33/290; 33/DIG. 21

(58) Field of Classification Search ........... 33/290–291, 33/285–286, 281–283, 276, 293, 228, DIG. 21
See application file for complete search history.

(56) References Cited

U.S. PATENT DOCUMENTS

| | | | |
|---|---|---|---|
| 3,116,557 A | 1/1964 | Trice, Jr. | 33/46 |
| 3,612,700 A | 10/1971 | Nelson | 356/153 |
| 3,631,601 A | 1/1972 | McNulty | 33/46 AT |
| 3,634,941 A | 1/1972 | Roodvoets et al. | 33/74 D |
| 3,742,581 A | 7/1973 | Roodvoets | 29/407 |
| 3,815,250 A | 6/1974 | Roodvoets et al. | 33/286 |
| 3,827,155 A | 8/1974 | Menzel | 33/228 |
| 3,827,156 A | 8/1974 | Roodvoets et al. | 33/228 |
| 3,857,449 A | 12/1974 | Kimura | 175/26 |
| 3,907,435 A | 9/1975 | Roodvoets | 356/153 |
| 4,026,371 A | 5/1977 | Takada et al. | 175/45 |
| 4,053,238 A | 10/1977 | George et al. | 356/249 |
| 4,367,021 A * | 1/1983 | Nordgren et al. | 353/121 |
| 4,403,664 A | 9/1983 | Sullinger | 175/24 |
| 4,681,439 A | 7/1987 | Shoemaker | 356/154 |
| 4,881,083 A | 11/1989 | Chau et al. | 342/459 |
| 4,907,879 A * | 3/1990 | Webb | 356/139.05 |
| 5,051,934 A | 9/1991 | Wiklund | 364/561 |
| 5,055,666 A | 10/1991 | Miyahara | 250/206.1 |
| 5,084,980 A | 2/1992 | Skopec et al. | 33/286 |
| 5,095,629 A | 3/1992 | Klemer et al. | 33/293 |
| 5,347,136 A | 9/1994 | Ammann | 250/206.3 |
| 5,359,781 A | 11/1994 | Melville | 33/286 |
| 5,400,514 A | 3/1995 | Imbrie et al. | 33/286 |
| 5,465,493 A | 11/1995 | Sobottke et al. | 33/286 |
| 5,469,155 A | 11/1995 | Archambeault et al. | 340/853.4 |

(Continued)

FOREIGN PATENT DOCUMENTS

EP    0 699 891 B1    8/2001

(Continued)

*Primary Examiner*—Yaritza Guadalupe-McCall
(74) *Attorney, Agent, or Firm*—Greer, Burns & Crain, Ltd.

(57) ABSTRACT

The invention provides a pipe laser that automatically self levels an inner frame system in both cross-axis and on-axis directions to provide a completely level reference for grade and line control adjustments mechanisms of a reference line generating laser source. The invention also provides a pipe laser that is operable via a bidirectional remote control.

36 Claims, 16 Drawing Sheets

U.S. PATENT DOCUMENTS

| | | | |
|---|---|---|---|
| 5,485,266 A | 1/1996 | Hirano et al. | 356/249 |
| 5,552,886 A | 9/1996 | Kitajima et al. | 356/250 |
| 5,575,073 A | 11/1996 | von Wedemayer | 33/365 |
| D376,111 S | 12/1996 | Ishii | D10/66 |
| 5,583,623 A | 12/1996 | Bartholmae et al. | 355/274 |
| 5,583,685 A | 12/1996 | Ohtomo et al. | 359/197 |
| 5,585,623 A | 12/1996 | Ohtomo et al. | 250/214 R |
| 5,606,802 A | 3/1997 | Ogawa | 33/276 |
| 5,621,531 A | 4/1997 | Van Andel et al. | 356/399 |
| 5,621,975 A * | 4/1997 | Rando | 33/227 |
| 5,655,307 A | 8/1997 | Ogawa et al. | 33/291 |
| 5,680,208 A * | 10/1997 | Butler et al. | 356/250 |
| 5,689,330 A | 11/1997 | Gerard et al. | 356/138 |
| 5,708,748 A | 1/1998 | Ohtomo et al. | 385/120 |
| 5,774,211 A | 6/1998 | Ohtomo et al. | 356/141.2 |
| 5,839,199 A | 11/1998 | Ogawa | 33/276 |
| 5,907,907 A | 6/1999 | Ohtomo et al. | 33/291 |
| 6,085,155 A * | 7/2000 | Hayase et al. | 702/40 |
| 6,102,137 A | 8/2000 | Ward et al. | 175/45 |
| 6,184,979 B1 | 2/2001 | Hirano et al. | 356/247 |
| 6,248,989 B1 | 6/2001 | Ohishi | 250/205 |
| 6,262,801 B1 | 7/2001 | Shibuya et al. | 356/139.08 |
| 6,279,668 B1 | 8/2001 | Mercer | 175/45 |
| 6,314,650 B1 | 11/2001 | Falb | 33/286 |
| 6,427,348 B1 | 8/2002 | Webb | 33/286 |
| 6,427,784 B1 | 8/2002 | Archambeault et al. | 175/45 |
| 6,525,538 B1 | 2/2003 | Mercer | 324/326 |
| 6,556,287 B1 | 4/2003 | Dennis | 356/138 |
| 6,625,895 B2 | 9/2003 | Tacklind et al. | 33/286 |
| 6,675,489 B2 | 1/2004 | Ohtomo et al. | 33/290 |
| 6,688,408 B2 | 2/2004 | Barbera et al. | 175/45 |
| 6,710,319 B2 | 3/2004 | Ohtomo et al. | 250/206.1 |
| 6,735,879 B2 | 5/2004 | Malard et al. | 33/286 |
| 6,766,869 B2 | 7/2004 | Brand et al. | 175/24 |
| 6,881,926 B2 | 4/2005 | Ohtomo et al. | 219/121.73 |
| 6,922,901 B1 * | 8/2005 | Chou et al. | 33/290 |
| 6,931,740 B2 | 8/2005 | Marshall et al. | 33/286 |
| 6,935,439 B2 | 8/2005 | Mercer | 175/45 |
| 7,013,990 B1 | 3/2006 | Nickel et al. | 175/45 |
| 7,039,089 B2 | 5/2006 | Kishi et al. | 372/103 |
| 7,065,890 B1 * | 6/2006 | Chang | 33/286 |
| 7,081,606 B2 | 7/2006 | Osaragi et al. | 250/206.1 |
| 7,152,334 B2 * | 12/2006 | Gamal et al. | 33/290 |
| 2002/0062570 A1 | 5/2002 | Palumbo, II et al. | 33/286 |
| 2003/0101605 A1 | 6/2003 | Tacklind et al. | 33/286 |
| 2003/0101606 A1 | 6/2003 | Li | 33/286 |
| 2003/0145474 A1 * | 8/2003 | Tacklind et al. | 33/290 |
| 2005/0022399 A1 | 2/2005 | Wheeler et al. | 33/286 |
| 2005/0117153 A1 | 6/2005 | Kishi et al. | 356/399 |
| 2005/0166409 A1 * | 8/2005 | Chou et al. | 33/290 |
| 2005/0274030 A1 | 12/2005 | Spanski et al. | 33/286 |
| 2006/0107539 A1 * | 5/2006 | Gamal et al. | 33/290 |
| 2007/0214666 A1 * | 9/2007 | Kishi et al. | 33/281 |
| 2008/0120853 A1 * | 5/2008 | Munroe et al. | 33/286 |
| 2009/0144995 A1 * | 6/2009 | Yahagi et al. | 33/293 |
| 2009/0244277 A1 * | 10/2009 | Nagashima et al. | 348/135 |

FOREIGN PATENT DOCUMENTS

| | | |
|---|---|---|
| EP | 1 154 233 B1 | 8/2006 |
| WO | WO 2005029122 A1 * | 3/2005 |
| WO | WO 2005/057130 A1 | 6/2005 |

* cited by examiner

PIPE LASER

RELATED APPLICATIONS

This application claims the benefit of U.S. Provisional Patent Application No. 60/865,592, filed Nov. 13, 2006, which is hereby incorporated herein by reference in its entirety.

BACKGROUND OF THE INVENTION

1. Field of the Invention

The invention relates to a pipe laser.

2. Description of Related Art

Conventional laser reference generating devices, such as laser devices used for laying pipe, typically include some type of grade adjustment feature so that pipe sections may be laid at different grades depending on the particular need of a project. Some conventional pipe lasers also include horizontal line control adjustment features to assist in directionality of pipe laying projects. These features of conventional pipe lasers place a high premium on leveling accuracy.

For example, if a pipe laser device is not level in the "on-axis" direction (i.e., the direction generally coincident with the line of the reference laser beam), grade adjustment calculations may be thrown off. As such, conventional pipe lasers include some type of on-axis leveling feature (e.g., to ensure that the laser itself is at a zero grade).

However on-axis leveling is not the only leveling problem faced by laser generating devices. Pipe lasers and other laser generating devices must also be concerned with cross-axis leveling (i.e., leveling in a direction perpendicular to the on-axis direction/laser reference beam). If a pipe laser is not level in the cross-axis direction (e.g., the device is "rolled" to some extent) grade adjustment will not occur along a completely vertical plane and line control adjustment will not occur along a completely horizontal plane.

Some conventional pipe lasers provide a bubble vial on the external surface of the pipe laser to indicate a rough estimate of cross-axis level, enabling users to attempt to manually adjust the cross-axis level of the laser. However, bubble vials and manual cross-axis leveling alone are not precise enough to ensure a completely level system, especially for use at long distances.

Some conventional pipe lasers attempt to deal with cross-axis mis-leveling using their line control functions. For example, if a pipe laser is out of level in the cross axis direction and the grade of the reference laser on that pipe laser is adjusted, the reference laser will deviate horizontally from the target. The conventional pipe laser may detect this out of level condition using an electrolytic level vial and utilize its line control to horizontally adjust the reference laser back to its target. The actual grade arrived at by the convention pipe laser will also be different from the desired grade, so additional adjustments will have to be made to adjust the grade as well. The problem with this line control compensation technique is that the calculation required to accurately utilize line control and additional grade adjustments is complicated and error prone, producing more of an estimated correction rather than an actual correction. Furthermore, certain types of electrolytic leveling vials used in some conventional pipe lasers may be inaccurate at certain temperatures. As such, a temperature compensation component must be added to the already complicated compensation calculation.

Thus, there exists a need for an improved leveling system for pipe laser devices. The invention solves these and other problems in the art by providing a pipe laser that is automatically self leveling in both on-axis and cross axis directions.

Other problems with conventional pipe lasers include poor remote control functionality. Remote controls can be useful for the use of pipe lasers because pipes are often laid in deep ditches in the ground, thus posing problems with direct access to a pipe laser positioned within a pipe. However, conventional pipe laser remote controls provide unidirectional communication, such that an operator using a remote control is unsure whether his or her commands were received or implemented by the pipe laser and is unaware of certain status information relating to the pipe laser (e.g., battery level, environmental temperature, etc.). Furthermore, some conventional pipe laser remote controls utilize infrared light communication, which is unreliable in certain conditions, such as where a direct line of sight from a remote transmitter to a pipe laser receiver is unavailable. Other problems also exist.

As such there is a need for an improved remote control system for pipe lasers. The invention solved these and other problems in the art by providing a bidirectional remote controlled pipe laser.

BRIEF SUMMARY OF THE INVENTION

In some embodiments, the invention provides a pipe laser that automatically self-levels in both on-axis and cross-axis directions. A pipe laser according some embodiments of the invention includes a housing having a display screen and one or more input mechanisms. The housing may include a first end and a second end. In some embodiments, the display and the one or more input mechanisms may be mounted at the first end of the housing. In some embodiments, the pipe laser generates a reference laser beam that exits from the second end of the housing.

Secured within the housing may be an internal mechanism, which forms at least part of the internal components of the pipe laser. The internal mechanism may include an outer frame secured to the housing. The internal mechanism may also include an inner frame system of components that may pivot or otherwise move in one or more directions relative to the outer frame and the housing. An automatic cross-axis leveling mechanism, an automatic on-axis leveling mechanism, a grade adjustment mechanism, a line control adjustment mechanism, a laser source for generating the reference laser beam, and/or other components may comprise the inner frame system.

In some embodiments of the invention, the automatic cross-axis leveling system may include an outer gimbal that rotates relative to the outer frame around an axis that is generally coincident with the reference laser beam (at zero grade or line adjustment). Some or all of the other components comprising the inner frame system rotate or "roll" along with outer gimbal, including the grade and line control adjustment leveling systems and the laser source. As such, this rotation around an axis coincident with the reference laser beam enables leveling of the inner frame system (at least the part that rotates with the outer gimbal) along an axis perpendicular to the reference laser beam (at zero grade and line adjustment), thus enabling "cross-axis leveling.

Roll of outer the outer gimbal may be automatically driven by a cross-axis control motor to a level position based on position-from-level information sensed by cross axis level sensor. In some embodiments, the cross-axis level sensor may include a circuit board with an infra-red (IR) light emitter, a bubble vial positioned above the IR emitter, and a photosensitive circuit board positioned above the bubble vial. The IR emitter shines IR light onto and through the bubble vial, The position of the bubble in the bubble vial (which depends on the cross axis level position of the inner frame system) refracts or blocks the IR light shone through the bubble vial. As such, the light pattern that reaches the photosensitive circuit board varies based on the position of the bubble and thus the cross-axis level position of the inner frame system. The photosensitive circuit boards sends signals to a microprocessor indicating the out-of-level cross-axis position of the inner frame system. The processor then sends signals to the cross-axis control motor to rotate the outer gimbal such that the inner frame system is level relative to the cross-axis.

In some embodiments, the on-axis leveling system of the pipe laser levels at least a portion of the inner frame system, including the laser source, and the grade and line control adjustment mechanisms along an axis generally coincident with the reference laser beam (at zero grade and line adjustment) As such on-axis involves rotation around an axis that is perpendicular to the reference laser beam (at zero grade and line adjustment). In some embodiments, the on-axis leveling system includes a medial gimbal that pivots around axis perpendicular to the reference laser beam (at zero grade and line adjustment). The laser source as well as grade and line control adjustment mechanisms pivot along with the medial gimbal.

The on-axis leveling system includes an on-axis control motor driven by on-axis level information sensed by an on-axis level sensor. The on axis level sensor may be similar in construction to the cross-axis level sensor, but may be oriented perpendicularly therefrom so as to sense a level or out of level position in the on-axis direction As described herein, the inner frame system also includes grade control motor and line control mechanisms. The above described cross- and on-axis leveling systems provide a completely level reference from which to accurately adjust the grade and line position of the laser source and thus the reference laser beam. Adjustment to the grade and line position of the reference laser beam is accomplished using encoders. The encoders include knowledge regarding how much actuation of respective grade and line control motors translates into specific grade and line control measurements. As such the grade and line control adjustment mechanism need no distinct sensors of their own to indicate resultant degree of grade or line control adjustment.

In some embodiments, the invention may provide a remote controlled pipe laser with bidirectional communication between the remote control unit and the pipe laser unit. In some embodiments, the circuitry of the pipe laser unit may include a first transceiver and the remote control unit may include a second transceiver. In some embodiments, the transceiver may include radio frequency (RF) transceivers that both send and receive instructions/data via radio waves. The use of RF communication may enable communication with a remote control unit that is not limited by "line of sight."

Both the first transceiver of the pipe laser unit and second transceiver of the remote control unit may be "addressable," that is, they may each be programmable to communicate with transceivers, transmitting elements, or receiving elements, having a certain address (which may be a simple numerical indicator or which may be indicative of a certain communication frequency). For a certain pipe laser unit to communicate with a remote control unit the respective first and second transceivers must be programmed to the same address. The first and second transceivers of the pipe laser and remote control units may also have selectable addressability, as described below. This selectable addressability feature of the pipe laser and remote control units enables a single pipe laser to be controlled using multiple remote controls and enables a single remote control to control multiple pipe lasers. It also enables multiple users and multiple remotes to be used in proximity with one another without interference. This configurability enables versatile interoperability between multiple remote control units and multiple pipe laser units that may be advantageous on a job site.

As described herein, communication between a remote control unit and a pipe laser unit may be bi-directional. This bi-directionality enable numerous features of the remote controlled pipe laser of the invention. For instance, in some embodiments, the invention provides a process for utilizing and/or communicating with a pipe laser unit using a bi-directional remote control. In one embodiment, the remote control unit sends a command to pipe laser via the remote control unit's transceiver (e.g., the second transceiver). The pipe laser unit receives the command via its transceiver (e.g., the first transceiver). The command is passed to a microprocessor of the pipe laser unit, which performs any necessary validation and/or calculations and sends appropriate signals to the appropriate elements of pipe laser unit to act upon the command. The command may then be acted upon by the appropriate elements of the pipe laser unit. The pipe laser unit then sends a response to the command to the remote control unit from the pipe laser unit's transceiver (e.g., the first transceiver). The remote control unit receives the response at its transceiver (e.g., the second transceiver). A display screen of the remote control unit is then updated according to the response. In some embodiments, the response may cause remote control unit to update its display screen to indicate that the command was received and acted upon. In some embodiments, an indication that the command was acted upon may include the remote control unit displaying the commanded grade, only when the commanded grade is reached. In some embodiments, the update to the display screen may indicate a progression of action upon the command (e.g., as the grade adjustment mechanism adjusts the grade, the display may show an incremental progression through the grade adjustment). In some embodiments, the response may simply acknowledge that the command was received by sending the command back to the remote control unit.

These and other objects, features, and advantages of the invention will be apparent through the detailed description and the drawings attached hereto. It is also to be understood that both the foregoing summary and the following detailed description are exemplary and not restrictive of the scope of the invention.

DETAILED DESCRIPTION

In some embodiments, the invention provides a pipe laser with bi-directional remote control. In some embodiments, the invention provides a pipe laser that automatically self-levels in both on-axis and cross-axis directions.

"On-axis" leveling refers to leveling at least a portion of the pipe laser assembly along an axis coincident to the reference laser beam projected by the pipe apparatus (when the reference laser beam is at a zero grade and zero line control adjustment position). In other words, at least part of the pipe laser assembly is first leveled relative to the earth so that subsequent grade adjustments begin from a level position.

"Cross-axis" leveling refers to leveling at least portions of the pipe laser assembly along an axis perpendicular to the reference laser beam projected by the pipe laser apparatus (when the reference laser beam is at a zero grade and zero line adjustment setting). In other words, at least part of the pipe laser assembly is first leveled relative to the earth so that subsequent grade adjustments are completely vertical in nature and subsequent line control adjustments are completely horizontal in nature.

Figure 1:
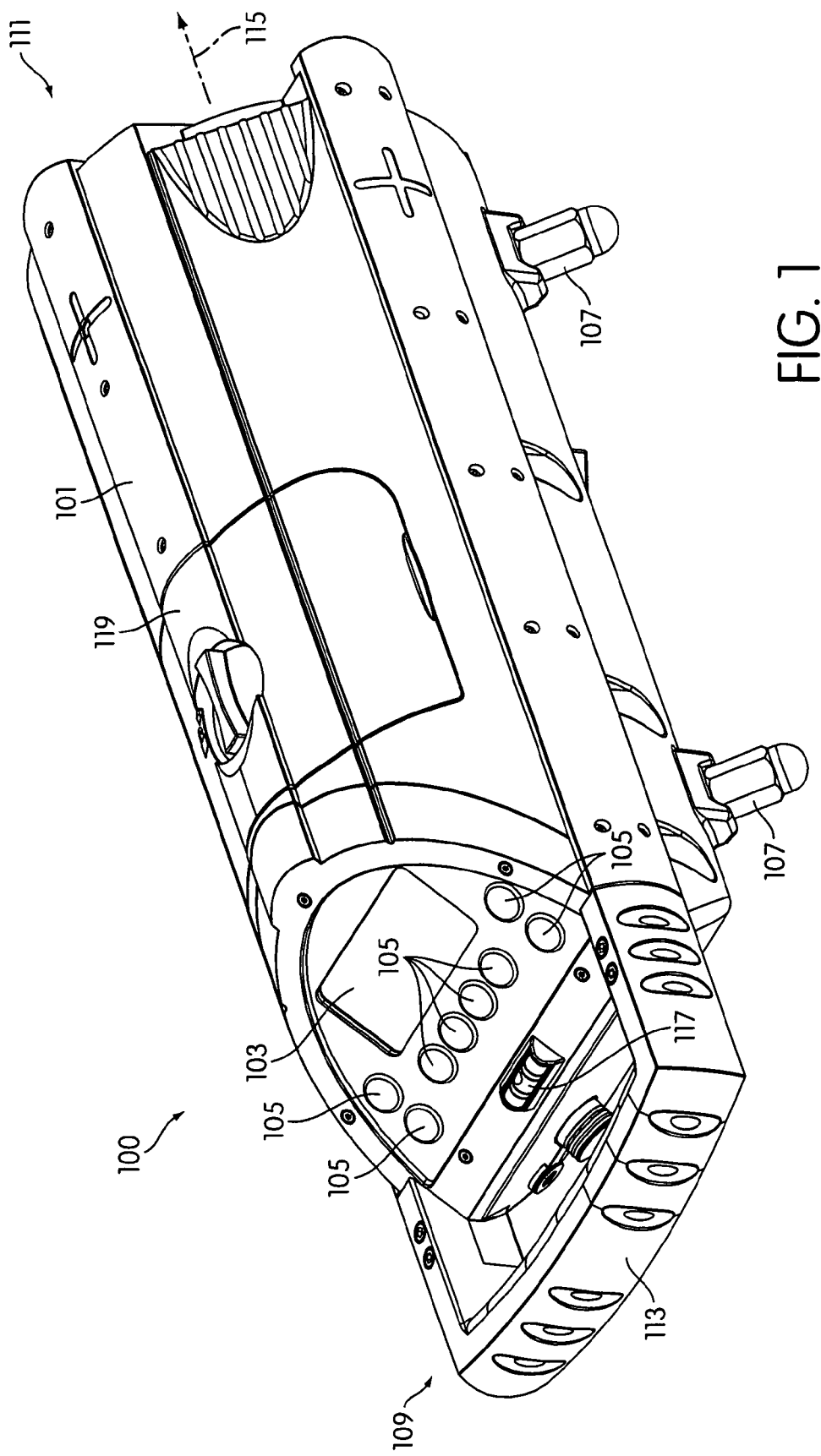
FIG. 1 illustrates a perspective view of an example of a pipe laser, according to an embodiment of the invention.

FIG. 1 illustrates a perspective view of a pipe laser 100 according to an embodiment of the invention. Pipe laser 100 includes a housing 101. Mounted on housing 101 is a display screen 103 that displays information to users such as, for example, the grade of a reference laser beam produced by the pipe laser, the horizontal line position of the reference laser beam, the status of the battery of the pipe laser and/or any associated remote control, the power and/or brightness of the reference laser, the orientation of a user operating a remote control relative to the pipe laser (e.g., which end of the pipe laser is the user facing), a lock status of input mechanisms on the pipe laser and/or the remote control, an address on which the pipe laser and/or remote control is associated with, any error information relating to the pipe laser, temperature information regarding the surroundings of the pipe laser, and/or other information. In some embodiments, display 103 may enable display of one or more menus of one or more options or features of pipe laser 100.

One or more input mechanisms 105 may also be mounted on housing 101 of pipe laser 100. One or more input mechanisms 105 may enable receipt of user input to pipe laser 100, thus enabling selection and control of the features and functions of pipe laser 100.

Pipe laser 100 may also include one or more legs 107 protruding from housing 101. One or more legs 107 may be mounted on the underside of housing 101 and may provide support for pipe laser 100 for use in any number of environments such as, for example, inside or on top of a section of pipe.

Pipe laser 100 may include a first end 109 (e.g., a "back end") and a second end 111 (e.g., a front end"). In some implementations, display 103, one or more input mechanisms 105, and a handle 113 may be mounted at or near first end 109. Other configurations may also exist. In some implementations, the reference laser beam (not illustrated) may exit from pipe laser 100 and housing 101 from second end 111 and travel generally along an axis 115 (when grade and line control settings of the reference laser beam are set to zero).

In one embodiment, a rough leveling indicator 117 may be mounted on housing 101, for example, at or near first end 109. Rough leveling indicator 117 may roughly indicate the position of pipe laser 100 relative to a level position, about an axis coincident to axis 115. As such, rough leveling indicator 117 roughly indicates, up to a certain amount, the amount of roll of pipe laser 101. Thus rough leveling indicator 117 enables a user to place and/or manipulate the placement of pipe laser 100 so that it is roughly level along an axis perpendicular to axis 115. In some embodiments, rough level 117 may comprise a barrel/torpedo-shaped bubble vial. In some embodiments, the bubble vial used for rough level 117 may be accurate to 40 arc-minutes (the bubble moves 2 mm per 40 arc-minutes of tilt). A user may use rough leveling indicator to generally level pipe laser 100 in a cross axis direction. However, for some applications, the degree of accuracy provided by rough leveling vial is not precise enough to accurately level the pipe laser in the cross-axis direction. As such, for some embodiments, the automatic and more accurate cross axis leveling mechanisms discussed below are used.

In some embodiments, housing 101 may include an removable battery holder 119 to provide access to battery storage.

Figure 2A:
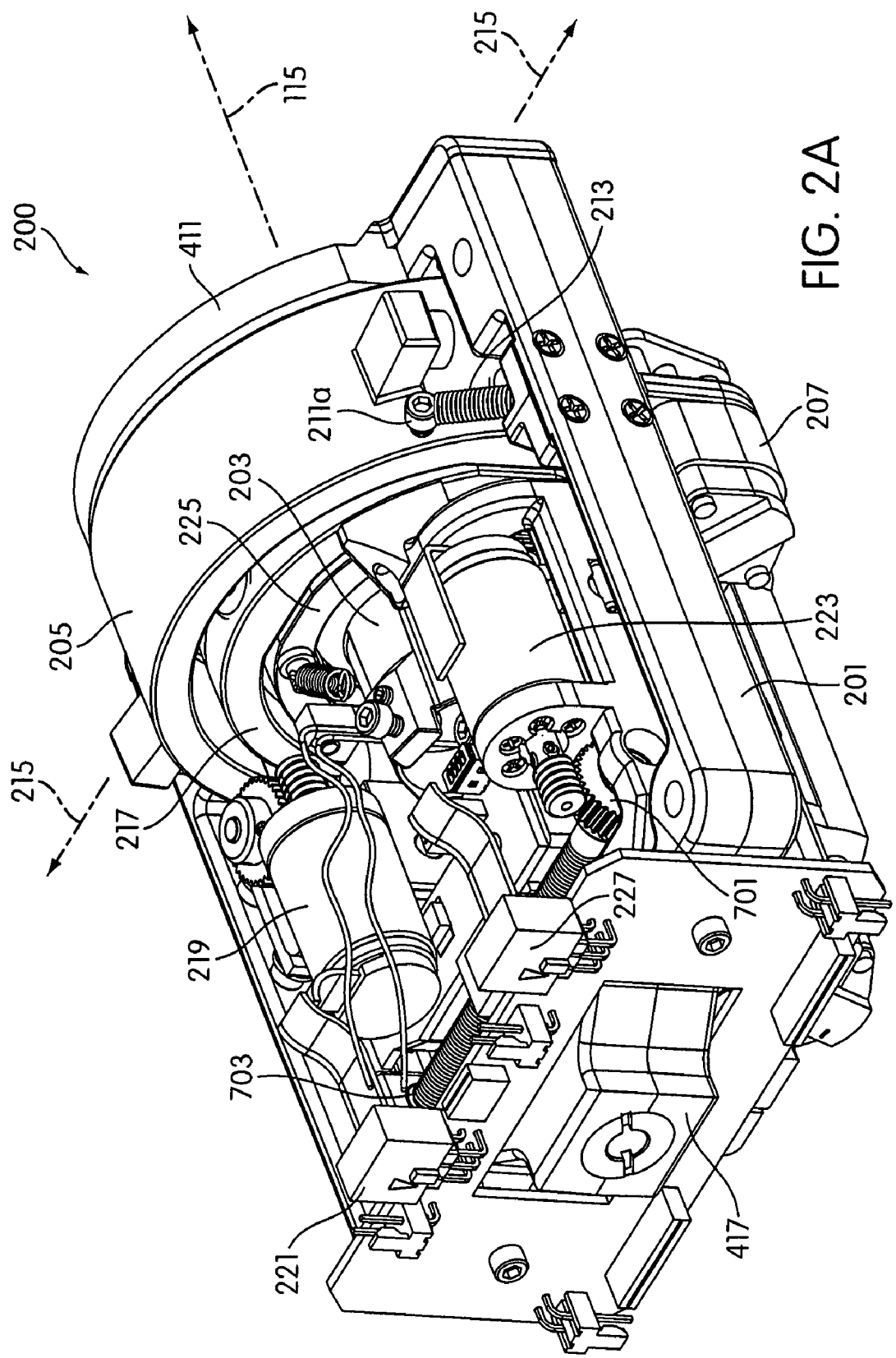
FIG. 2A illustrates a perspective view of an example of an inner mechanism for a pipe laser, according to an embodiment of the invention.

FIG. 2A illustrates an internal mechanism 200 which forms at least part of the internal components of pipe laser 100. Internal mechanism 200 resides within housing 101 of FIG. 1. In some implementations, internal mechanism 200 may include an outer frame 201. Internal mechanism 200 may also include an inner frame system comprised of a plurality of components that may pivot or otherwise move in one or more directions relative to outer frame 201. In some embodiments, the inner frame system mounts an automatic cross-axis leveling mechanism, an automatic on-axis leveling system, a grade adjustment system, a line control adjustment system, a laser source 203, and/or other components to outer frame 201. Outer frame 201 mounts the inner frame system to housing 101.

As described herein "cross-axis" leveling refers to leveling along an axis 215 that is perpendicular to axis 115 (generally the axis of the reference laser beam when grade and line control are set to zero). Note that cross axis leveling along axis 215, which is perpendicular to axis 115, involves rotation around axis 115.

In one embodiment, the inner frame system may include an outer gimbal 205 that comprises part of the automatic cross-axis leveling mechanism. Outer gimbal 205 may rotate about an axis coincident with axis 115. The connections between outer gimbal 205 and other components of the inner frame system may be such that rotation or "roll" of outer gimbal 205 serves to roll the other components of the inner frame system relative to outer frame 201 (and thus housing 101) such as, for example, the on-axis leveling mechanism, the grade adjustment mechanism, the line control adjustment mechanism, laser source 203, and/or other components. As such, cross-axis leveling via roll of outer gimbal 205, ensures that the on-axis leveling mechanisms and the grade and line control mechanisms operate from a consistently level cross-axis position, thus their accuracy is improved.

Outer gimbal 205 rolls relative to outer frame 201 via two bearings. A large outer gimbal bearing 409 is positioned at the interface between outer gimbal 205 and a front face 411 of outer frame 201 (see FIGS. 4, 7A, and 7B). A rear outer gimbal bearing 413 is positioned at the interface between the inner frame system and the rear portions of outer frame 201 (see FIGS. 4, 7A and 7B, wherein the inner frame system is labeled 415 and the rear portion of outer frame system is labeled 417).

Figure 8:
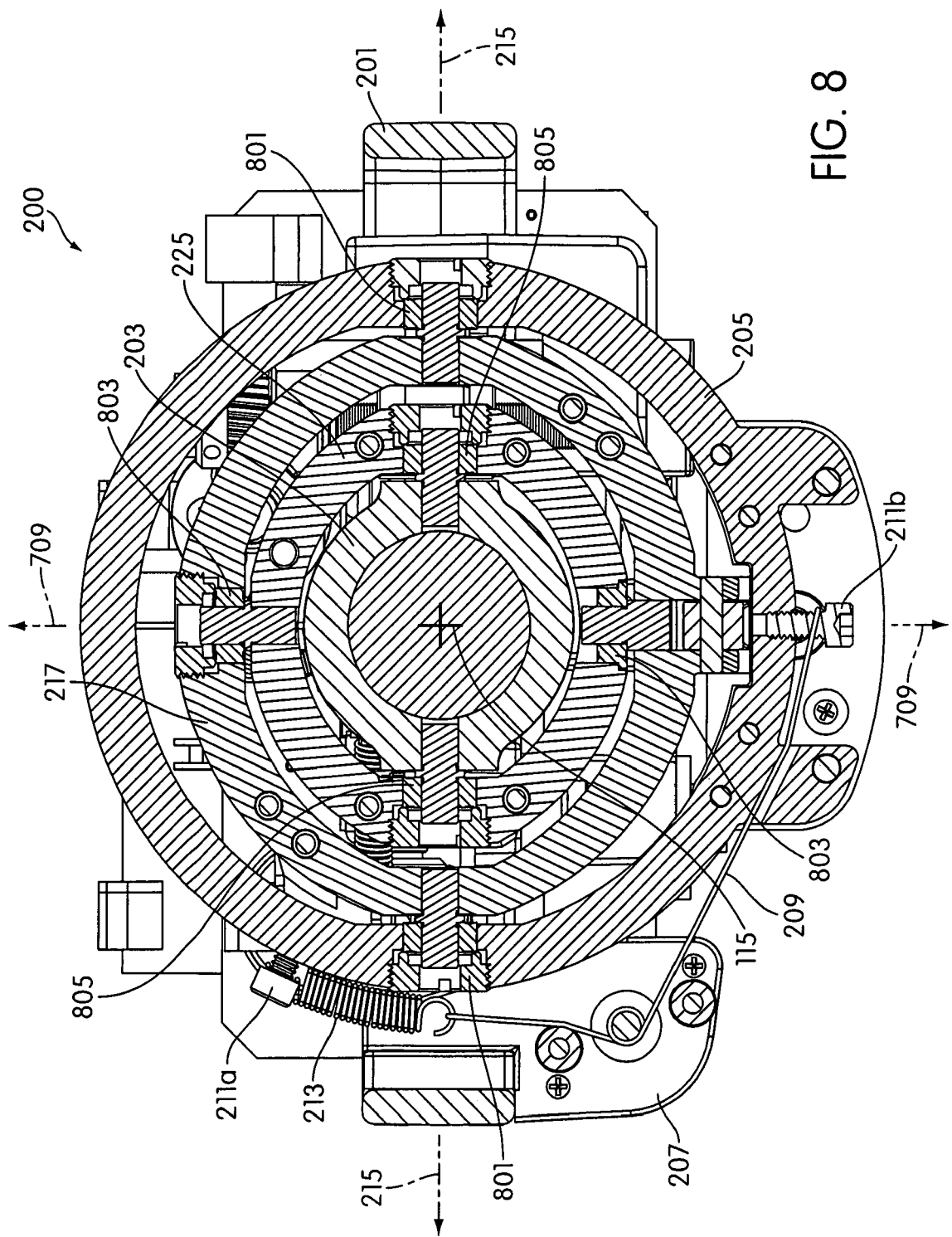
FIG. 8 illustrates a front cross-sectional view of an example of an inner mechanism for a pipe laser, according to an embodiment of the invention.

Roll of outer gimbal 205 may be driven by a cross-axis control motor 207. A drive string 209 is attached to cross axis control motor 207. Drive string 209 is also attached to outer gimbal 205, via bolts 211a, 211b (illustrated in FIG. 8), and spring 213. As illustrated in FIG. 8, bolt 211a and spring 213 secure a first end of drive string 209 at a first point on outer gimbal 205, while bolt 211b secure the second end of drive string 209 at a second point on outer gimbal 205. In some embodiments, drive string 209 may be wrapped around a shaft of cross-axis control motor 207 so that motion of the shaft is translated into motion of drive string 209.

As cross-axis control motor 207 is actuated in a first direction, for example, clockwise, drive string 209 pulls on bolt 211b causing rotation of outer gimbal 205 in a clockwise direction. As cross-axis control motor 207 is actuated in a second direction, for example, counter clockwise, drive string 209 pulls on spring 213 and bolt 211a causing rotation of outer gimbal 205 in a counter clockwise direction. Spring 213 ensures that adequate tension is maintained on drive string 209 such that motion of cross-axis control motor is translated into motion of drive string 209, and thus roll of outer gimbal 205 in either direction around axis 115. In some embodiments, drive string 209 need not be a string, but may be a belt, a chain, or other element or set of elements. In some embodiments, other mechanisms may be used to roll outer gimbal 205 or otherwise provide cross-axis leveling of the inner frame system.

Figure 3:
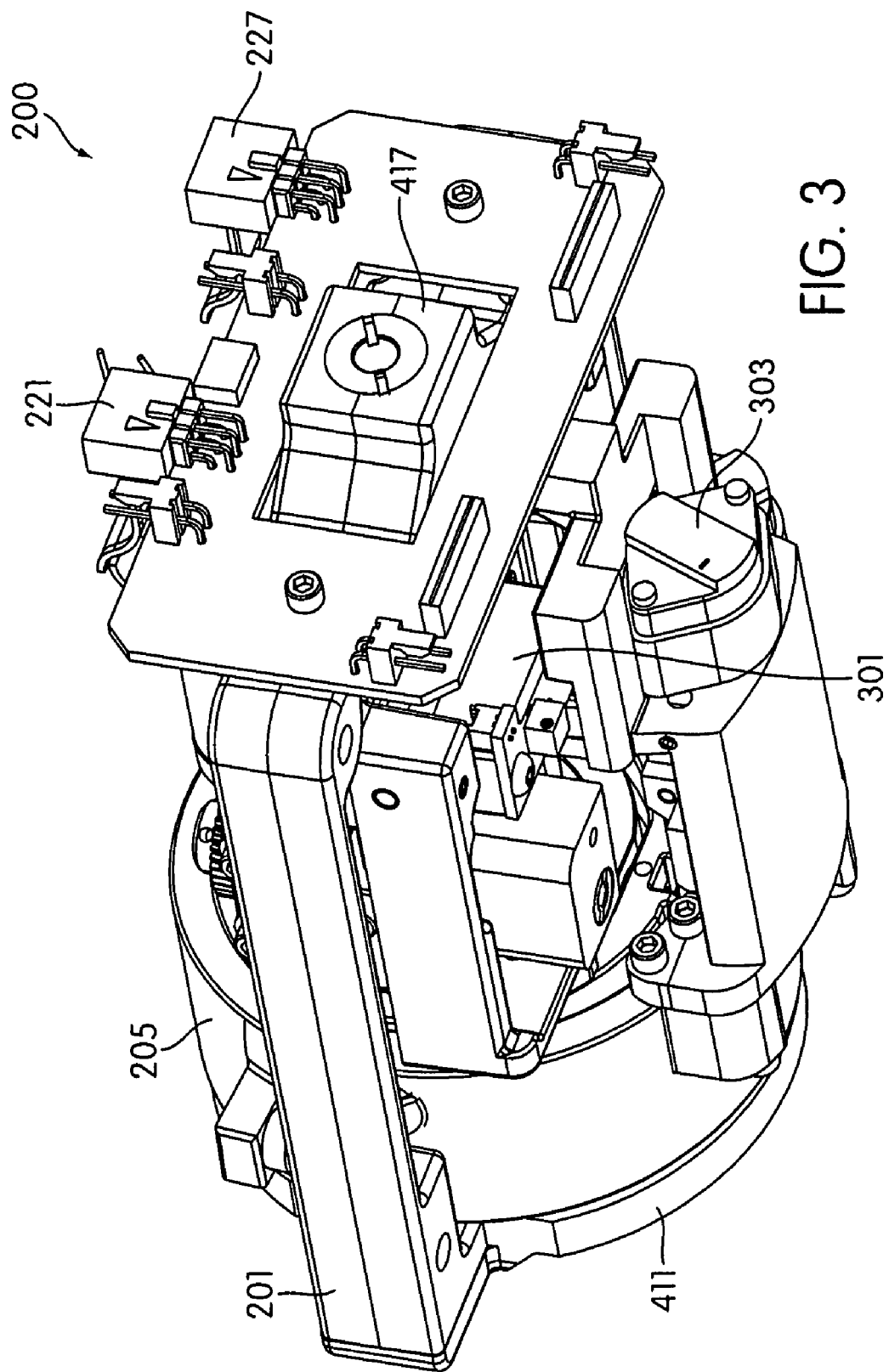
FIG. 3 illustrates a perspective view of an example of an inner mechanism for a pipe laser, according to an embodiment of the invention.

Cross-axis control motor 207 automatically drives outer gimbal 205 in either direction about axis 115 to a level cross-axis position based on the position-from-level sensed by cross-axis level sensor 301, illustrated in FIG. 3. In some embodiments, cross-axis level sensor 301 may include a circuit board with an infra-red (IR) light emitter, a bubble vial positioned above the IR emitter, and a circuit board having one or more photosensitive elements positioned above the bubble vial (see FIG. 6 for a similar level sensor for on-axis leveling). The IR emitter shines IR light onto and through the bubble vial, the bubble vial being oriented such that its long axis is parallel to axis 215. The position of the bubble in the bubble vial (which depends on the cross axis level position of the inner frame system) refracts or blocks the IR light shone through the bubble vial. As such, the light pattern that reaches the photosensitive circuit board varies based on the position of the bubble and thus the cross-axis level position of the inner frame system. The photosensitive circuit boards sends signals to a microprocessor indicating the out-of-level cross-axis position of the inner frame system. The process then sends signals to cross-axis control motor 207 to move outer gimbal 205 such that the inner frame system is level relative to the cross axis. In some embodiments, other level detecting systems may be used for cross-axis level sensor 301.

Pipe laser 100 and the inner frame system thereof may also include an automatic "on-axis" leveling system. On-axis leveling refers to leveling at least a portion of the inner frame system, the grade and line control adjustment mechanisms and laser source 203, along an axis coincident with axis 115. On-axis leveling involves rotation around an axis 215 that is perpendicular to axis 115. The inner frame system of internal mechanism 200 includes a medial gimbal 217, illustrated in FIG. 2A that pivots in two directions around axis 215. As described above, laser source 203, as well as the grade and line control adjustment mechanisms pivot with medial gimbal 217, such that these elements are automatically leveled "on-axis" during use of pipe laser 100.

Figure 4:
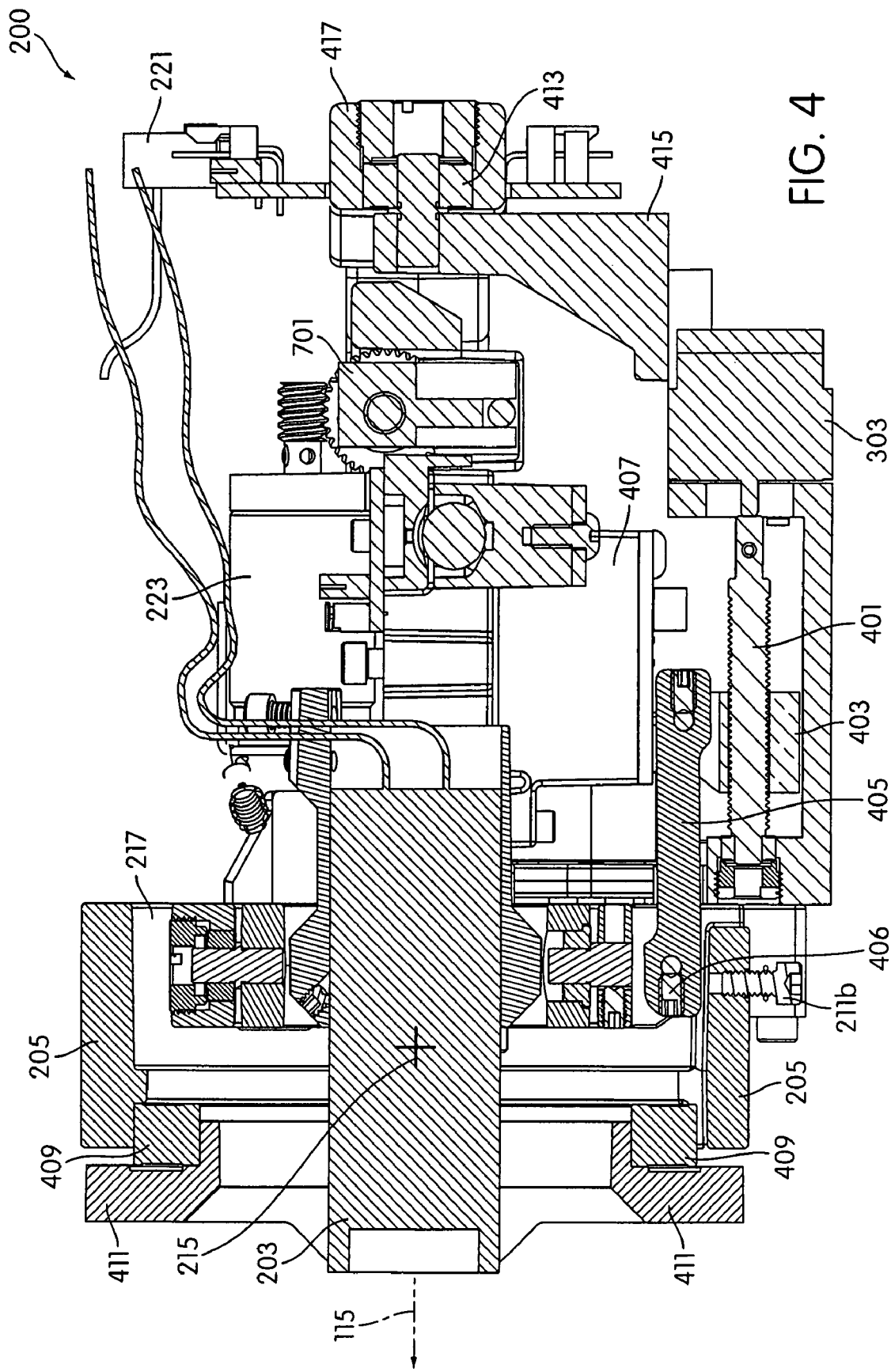
FIG. 4 illustrates a side cross sectional view of an example of an inner mechanism for a pipe laser, according to an embodiment of the invention.

FIG. 3 illustrates an on-axis control motor 303 which enables medial gimbal 217 to pivot for on-axis leveling. FIG. 4 illustrates a cross section view of the mechanism by which on-axis control motor 303 pivots medial gimbal 217. On-axis control motor 303 rotates a threaded shaft 401. Nut 403 is threaded around threaded shaft 401, such that nut 403 moves laterally along threaded shaft 401 when threaded shaft 401 is turned. Nut 403 is attached to a first end of a rigid member 405 (e.g., a bar, rod, or other rigid member), such that rigid member 405 is moved laterally as nut 403 moves laterally. A second end of rigid member 405 is attached to medial gimbal 217 at a point 406, such that lateral movement of rigid member 405 causes medial gimbal 217 to pivot about axis 215 (e.g., rigid member 405 pushes or pulls the bottommost region of medial gimbal 217, causing rotation about axis 215).

Figure 5:
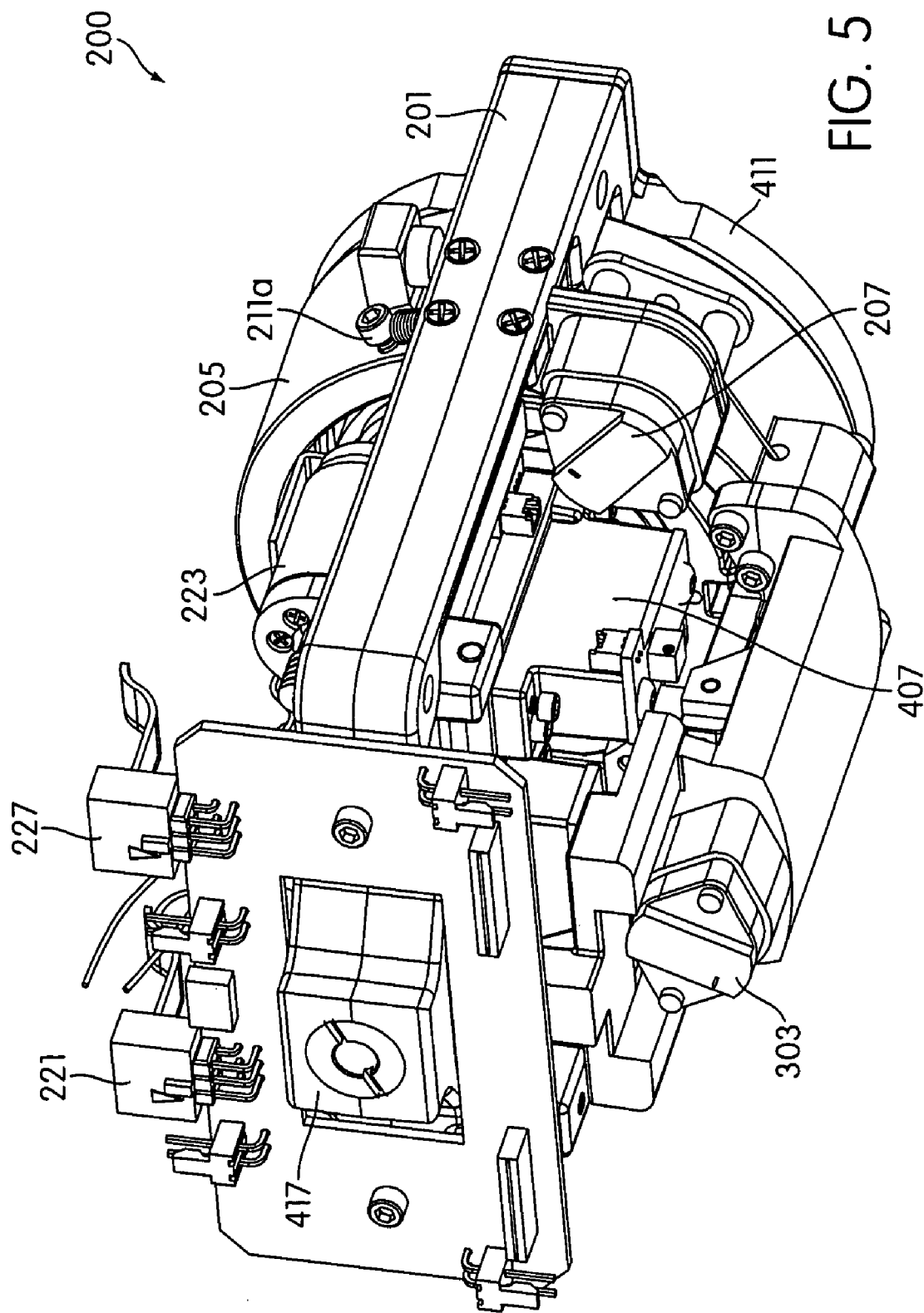
FIG. 5 illustrates a perspective view of an example of an inner mechanism for a pipe laser, according to an embodiment of the invention.

On-axis control motor 303 automatically causes medial gimbal 217 to pivot until medial gimbal 217 and thus laser source 203 and it's grade and line control adjustment mechanisms are level in an on-axis orientation. Pipe laser 100 utilizes an on-axis level sensor 407 (see FIGS. 4 and 5) to detect the on-axis level position of medial gimbal 217. In some embodiments, on-axis level sensor 407 operates similar to cross-axis level sensor 301 described above in that it includes an IR light source, a bubble vial, and a photosensitive circuit. However, the long axis of the bubble vial of on-axis level sensor is parallel to axis 115, not axis 215. Other tools and methods may be used to detect leveling in both on-axis and cross-axis directions.

Figure 6:
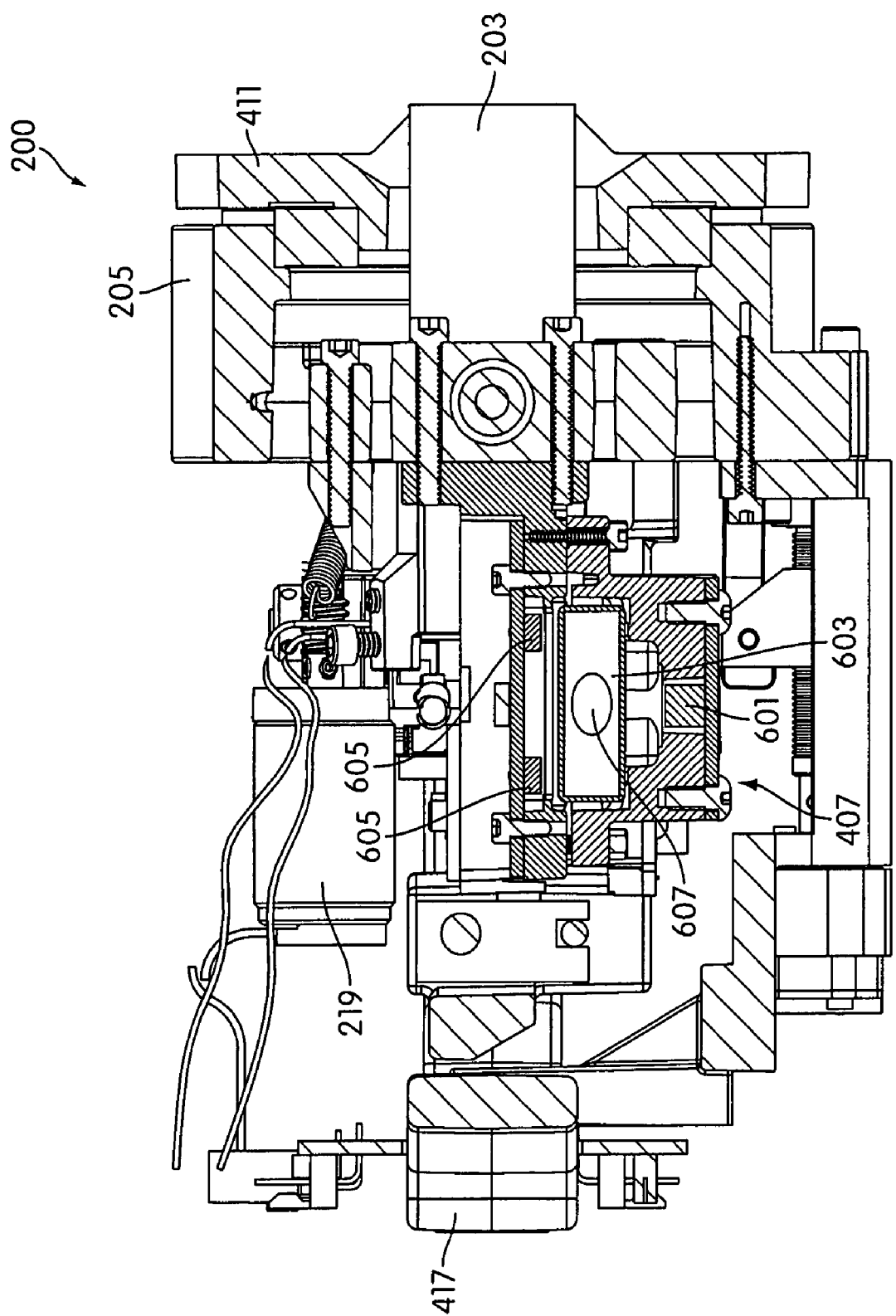
FIG. 6 illustrates a side cross-sectional view of an example of an inner mechanism for a pipe laser, according to an embodiment of the invention.

FIG. 6 illustrates a cross-section of on-axis level sensor 407, including a circuit board with an infra-red (IR) light emitter 601, a bubble vial 603 positioned above IR emitter 601, and two photosensitive elements 605 positioned above bubble vial 603. IR emitter 601 shines IR light onto and through bubble vial 603. The position of the bubble 607 in bubble vial 603 (which depends on the level position of the inner frame system) refracts or blocks the IR light shone through bubble vial 603. As such, the light pattern that reaches the photosensitive elements 605 varies based on the position of bubble 607, and thus the level position of the inner frame system.

In some embodiments, the elements comprising both cross-axis level sensor 301 and on-axis level sensor 407 may be termed "vial cups." The bubble vials used in one or both may comprise "spirit vials" that utilize, for example, mineral spirits or other liquid as a fluid component.

The photosensitive sensors 205 of on-axis level sensor 407 are connected to a common circuit board that sends signals to a microprocessor of pipe laser 100 indicating any out-of-level on-axis position of the inner frame system. The microprocessor then sends signals to on-axis control motor 303 to move medial gimbal 217 such that medial gimbal 217 is level, on-axis. As the grade and line control mechanisms and laser source 203 move with medial gimbal 217, they are also level in the on-axis direction.

As described above, the pipe laser according to the invention includes automatic cross-axis and on-axis leveling of an inner frame system that includes a laser source, grade control mechanisms, and line control mechanisms. As such, whenever the pipe laser is turned on, these automatic leveling mechanisms will find a level position for the entire inner frame system. Thus the grade control mechanisms and line control mechanisms will always have a level position from which to start, and their accuracy will be greatly improved.

Figure 2B:
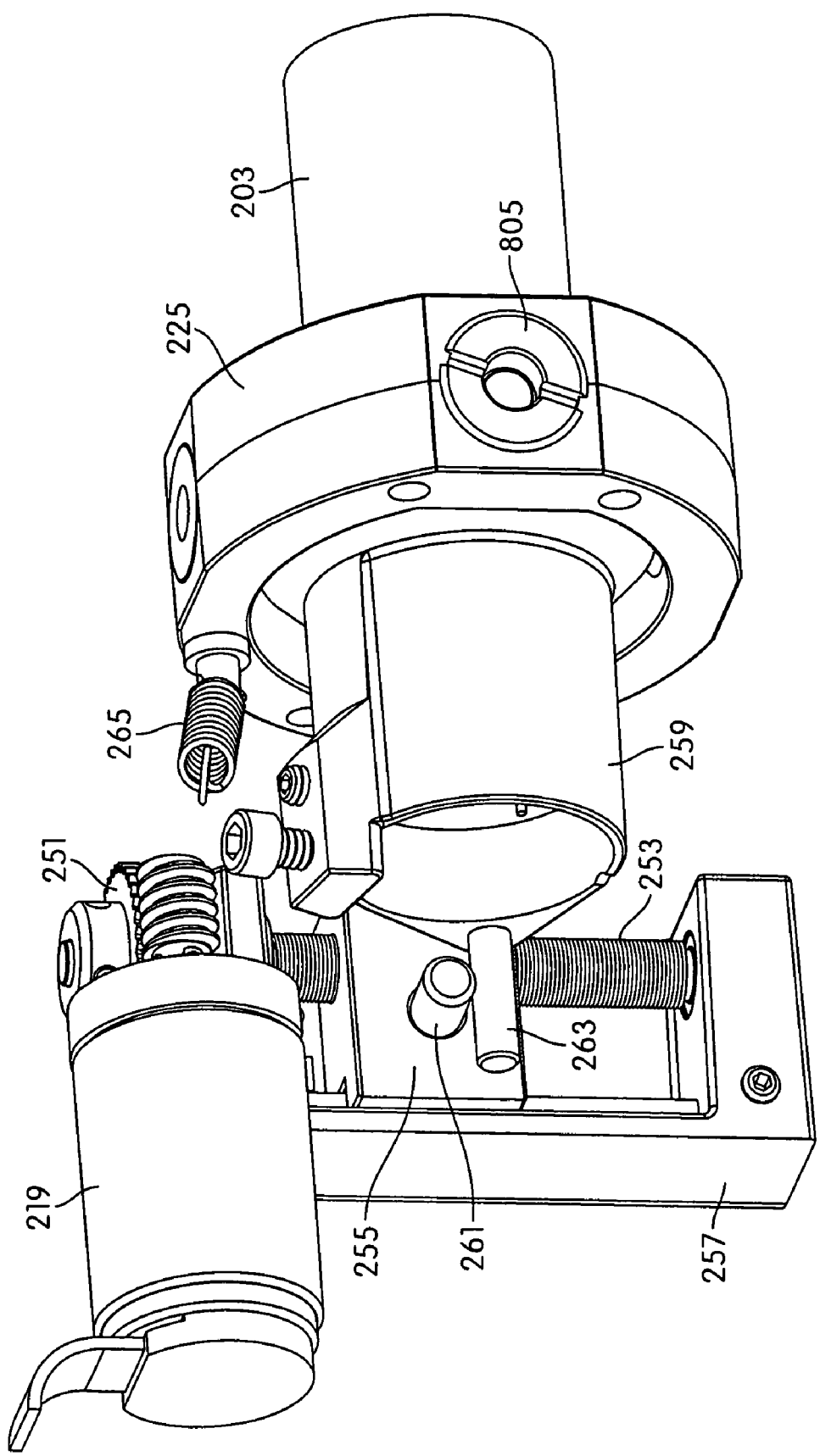
FIG. 2B illustrates a perspective view of an example of an inner mechanism for a pipe laser, according to an embodiment of the invention.

Internal mechanism 200 illustrated in FIG. 2A includes a grade control motor 219. The grade control motor acts to pivot laser source 203 up or down so as to adjust the grade or "pitch" of the reference laser beam produced by laser source. Grade control motor 219 is connected to a mechanism that pivots laser source 203 in two directions around an axis generally coincident with axis 215. FIG. 2B illustrates how actuation of grade control motor 219 is translated into change in the grade angle of laser source 203. As illustrated, movement of grade control motor 219 turns a gear 251, which in turn rotates a threaded shaft 253. Threaded member 255, which includes a threaded bore, is mounted on threaded shaft 253 such that rotational motion of threaded shaft 253 translates into vertical motion of threaded member 255 up and/or down threaded shaft 253. In some embodiments, threaded member 255 may be slidably secured to support slide 257, which may guide threaded member 255. Vertical movement of threaded member 255 may cause vertical movement of second end 259 of laser source 203 via pins 261 and 263, which causes light source to pivot around axis 215 (not illustrated) via bearings 805. In some embodiments, pins 261 and 263 may be permanently affixed to one another such that threaded member 255 may push or pull second end 259 of laser source 203. In some embodiments, pins 261 and 263 may not be permanently affixed to one another, but second end 259 of laser source 203 may move upwards via tension from spring which may be attached to the inner frame system. Other mechanisms for adjusting the grade or pitch of the reference laser beam may be used.

Grade control motor 219 is in communication with an encoder 221. Encoder 221 senses motor rotation and position of grade control motor 219 and communicates to the microprocessor exactly how much motion by grade control motor 219 translates into specific grade angles for the reference laser beam produced by laser source 203. In some embodiments, this knowledge of encoder 221 (which may be considered to store a reference "scale") is acquired/produced during a calibration process wherein known grade angles are set and motor positions are recorded at the known grade angles. Other calibration methods or methods of acquiring a scale for encoder 221 may be used. When a grade position is entered into an input mechanism of pipe laser 100, encoder 221 tells grade control motor 219 exactly how much motion to produce such that the grade of a resultant reference laser beam is at the entered grade. In some embodiments the amount of motion necessary to produce a certain grade angle is measured in "pulses" of electricity to the grade control motor.

Because they are part of the inner frame system, grade control motor 219 and the remainder of the grade control mechanism move with the on-axis and cross-axis leveling mechanisms described above. As such, any grade-related movement of laser source 203 or calculations by encoder 221 are relative to the platform provided by the inner frame system. For example, if the inner frame system is out of level in the on-axis direction (which would not occur with the automatic leveling system of the invention), then encoder 221's instructions to grade control motor will produce an incorrect resultant grade relative to the earth. Similarly, if the inner frame system is out of level in the cross-axis direction any adjustment of grade by grade control motor 219, will result in a reference laser beam that is out of horizontal alignment (i.e., the grade adjustment travels along a non-vertical plane). However, because the self-leveling mechanisms above provide an inner frame system that levels the grade control mechanism in both on-axis and cross-axis directions, accuracy of grade adjustment is ensured.

Figure 7A:
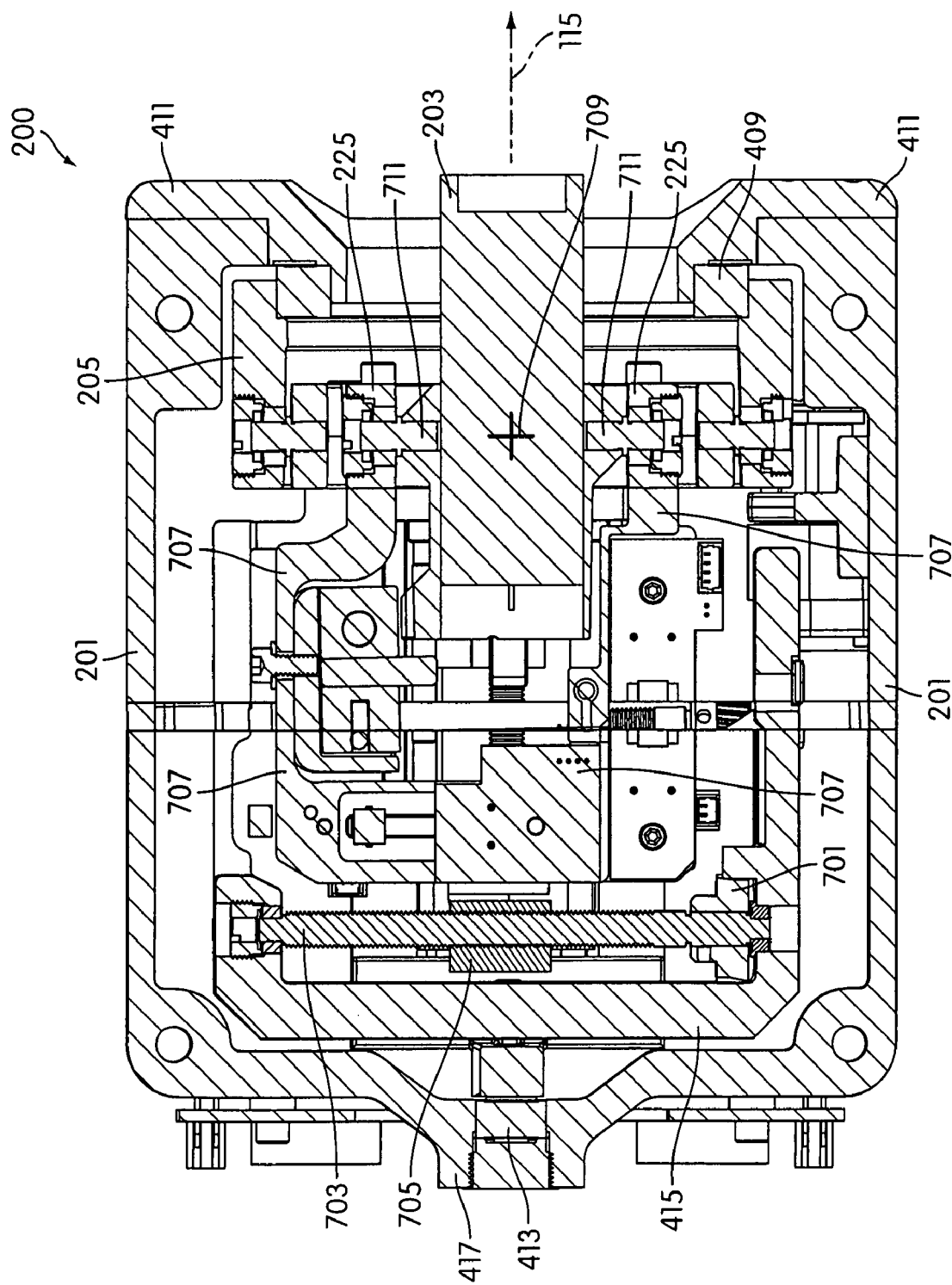
FIG. 7A illustrates a top cross sectional view of an example of an inner mechanism for a pipe laser, according to an embodiment of the invention.
Figure 7B:
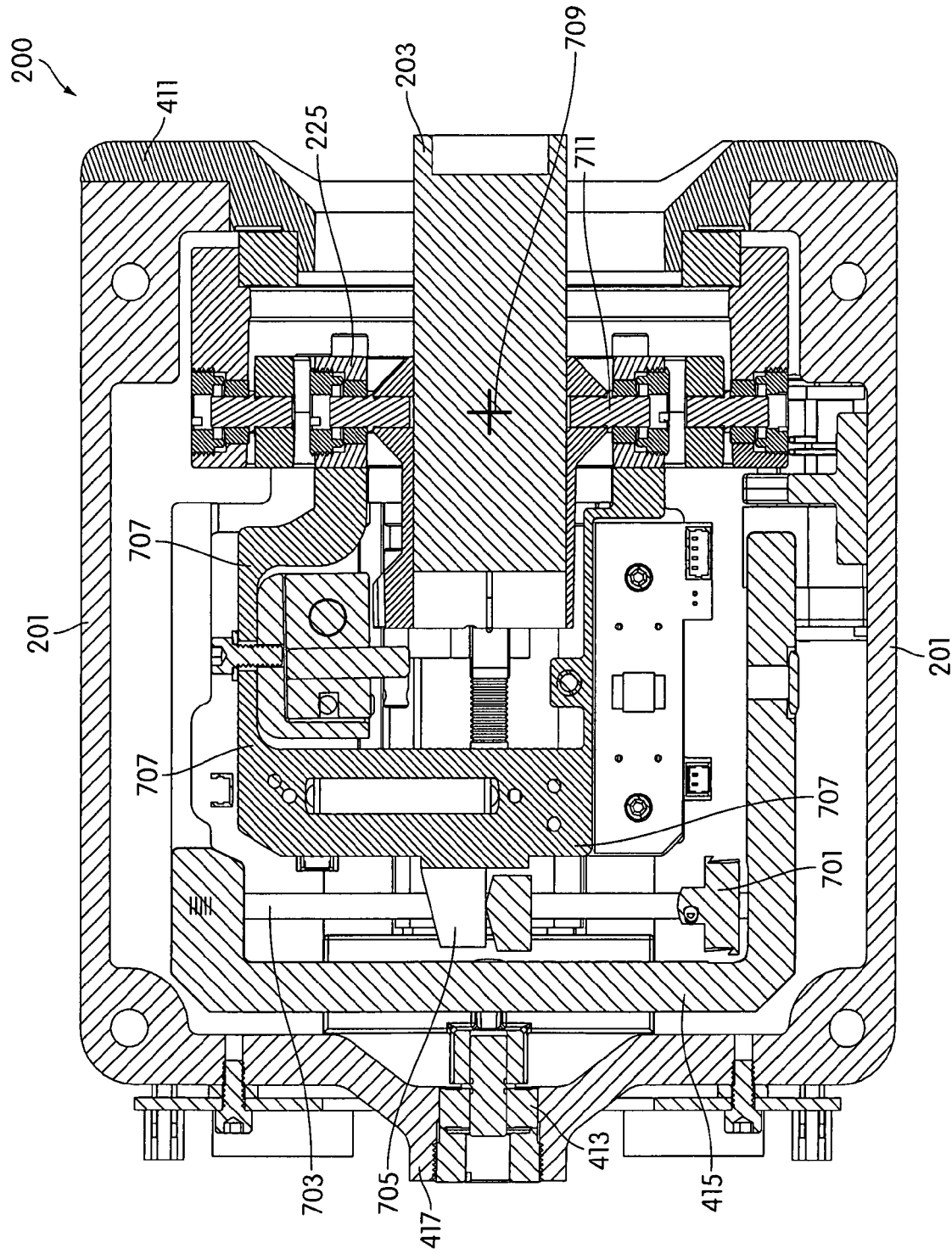
FIG. 7B illustrates a top cross sectional view of an example of an inner mechanism for a pipe laser, according to an embodiment of the invention.

Internal mechanism 200 illustrated in FIG. 2A also includes a line control motor 223. Line control motor adjusts laser source 203 left to right along a horizontal plane via an inner gimbal 225, thus providing "line control" for the reference laser beam. FIGS. 7A and 7B illustrate an example of a mechanism by which line control motor 223 may adjust the line control of the reference laser beam. Line control motor 223 (not illustrated in FIG. 7A or 7B) rotates a gear 701. Gear 701 turns a threaded shaft 703. Nut 705 is threaded along threaded shaft 703, such that rotation of threaded shaft 703 about its main axis translates into lateral movement of nut 705 along threaded shaft 703. Nut 705 is connected to pivot frame 707, which is in turn connected to inner gimbal 225. Pivot frame 707 is highlighted in FIG. 7B. As nut 705 moves laterally along threaded shaft 703, it causes pivot frame 707 and thus inner gimbal 225 to pivot in either direction about an axis 709. Because laser source 203 is statically connected to inner gimbal 225 by one or more elements 711, pivoting of inner gimbal 225 translates into pivoting of laser source 203, and thus movement of the reference laser beam along a horizontal plane.

Line control motor 223 is in communication with an encoder 227. Encoder 227 senses motor rotation and position and communicates to the microprocessor as to exactly how much motion by line control motor 223 translates into specific line control movements for the reference laser beam produced by laser source 203. In some embodiments, this knowledge of encoder 227 (which may be considered to store a reference "scale") is acquired/produced during a calibration process wherein known line control angles are set and motor positions are recorded at the known line control angles. Other calibration methods or methods of acquiring a scale for encoder 227 may be used. When a line control position is entered into an input mechanism of pipe laser 100, encoder 227 tells line control motor 223 exactly how much motion to produce such that the horizontal line position of a resultant reference laser beam is equal to the entered line position. In some embodiments the amount of motion necessary to produce a certain line control angle is measured in "pulses" of electricity to the grade control motor.

Because they are part of the inner frame system, line control motor 223, gear 701, threaded rod 703, nut 705, pivot frame 707, inner gimbal 225 and any other part of the line control mechanism moves with the on-axis and cross-axis leveling mechanisms described above. As such, any line control related movement of laser source 203 or calculations by encoder 227 are relative to the platform provided by the inner frame system. For example, if the inner frame system is out of level in the cross-axis direction any adjustment of line position by line control motor 223, will result in a reference laser beam that is not in its expected line control position (i.e., the line control adjustment travels along a non-horizontal plane. However, because the mechanisms above provide an inner frame system that levels the line control mechanism in both on-axis and cross-axis directions, accuracy of line control adjustment is ensured.

FIG. 8 illustrates a frontal cross-section view of internal mechanism 200, specifically the various gimbals and pivot points of the inner frame system that provides on-axis leveling, cross-axis leveling, grade adjustment, and line control adjustment. As illustrated in FIG. 8, the inner frame system includes outer gimbal 205, that pivots around an axis 115 to provide cross-axis leveling. As described above, the grade control and line control mechanisms, as well as the on-axis leveling mechanisms pivot with outer gimbal 205 as part of the inner frame system. Medial gimbal 217 pivots around an axis 215 on bearings 801 to provide on-axis leveling. As described above, the grade and line control mechanisms pivot with medial gimbal 217 as part of the inner frame system. Additionally, inner gimbal 225 pivots around an axis 709 on bearings 803, to provide line control for the reference laser beam of laser source 203. The grade control mechanisms pivot with inner gimbal, as part of the inner frame system. Finally, laser source 203 pivots around an axis generally coincident with axis 215 on bearings 805 to provide grade control for the reference laser beam.

Figure 9:
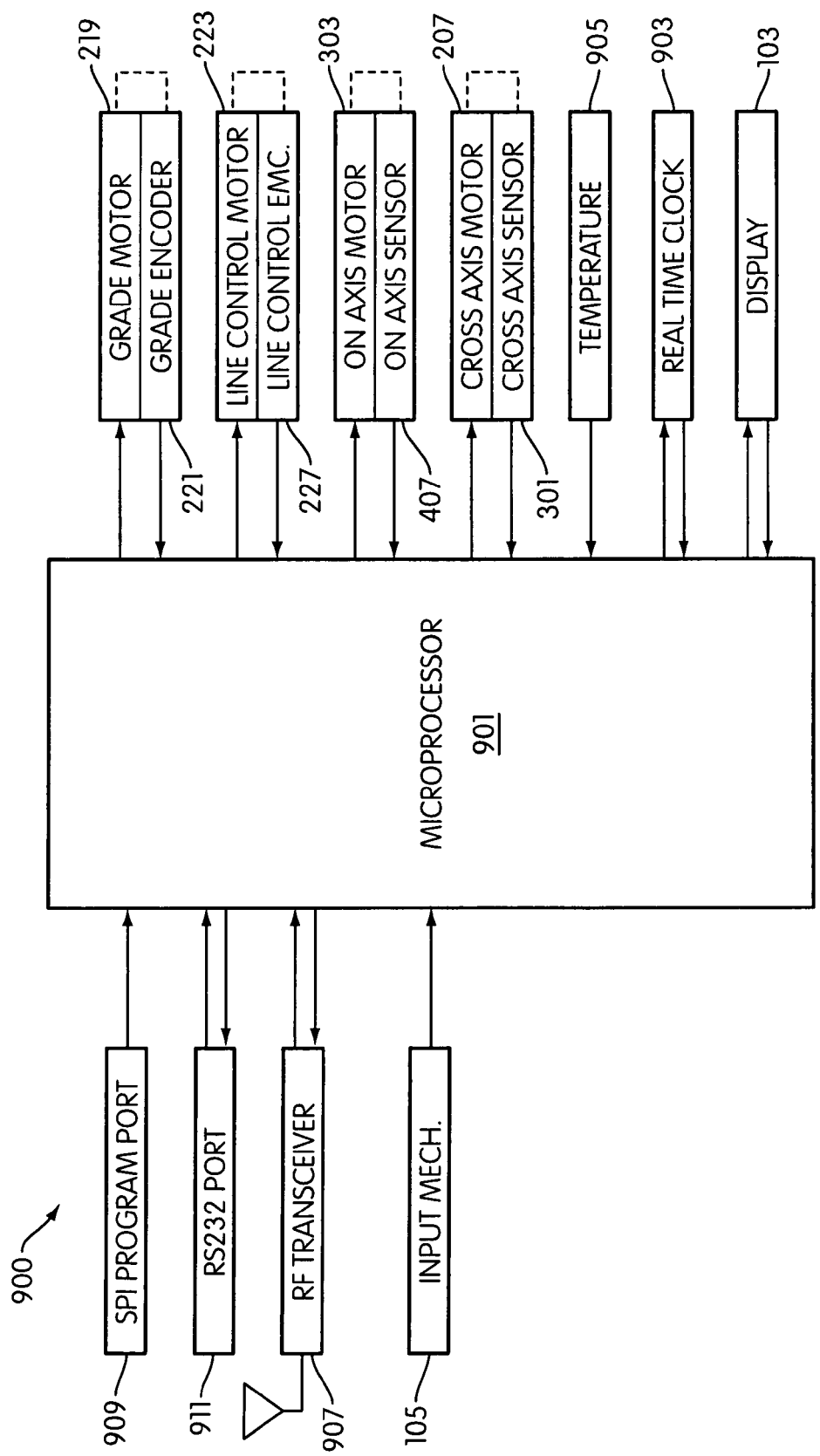
FIG. 9 illustrates an example of a circuit used in a pipe laser, according to an embodiment of the invention.

FIG. 9 illustrates a circuit 900, which is an example of a circuit for use in pipe laser 100. Circuit 900 includes a microprocessor 901 which may be used to receive data from one or more elements of pipe laser 100, process or manipulate data, send data to one or more elements of the invention, and/or perform other tasks. Circuit 900 may also include a real time clock 903, which may enable timekeeping (e.g., measuring or logging time between events), display of time to a user via a display (e.g., display 103 or a display on a remote control), and/or other features or functions.

Circuit 900 may also include a temperature gauge 905 that measures the temperature of air inside pipe laser 100. Temperature readings of the air inside pipe laser 100 may be used in performing any number of calculations, may be displayed to a user via a display, and/or may be used for other features or functions of the invention.

Circuit 900 may include cross-axis level sensor 301 and cross-axis control motor 207. In some embodiments, cross-axis level readings regarding the inner frame system of pipe laser 100 may be taken by cross-axis level sensor 301 and sent to microprocessor 901. Microprocessor 901 may in turn send signals to cross-axis control motor 207 to adjust the cross-axis level of the inner frame system according to an out-of-level measurement provided by cross-axis level sensor 301.

Circuit 900 may include on-axis level sensor 407 and on-axis control motor 303. In some embodiments, on-axis level readings regarding the inner frame system of pipe laser 100 may be taken by on-axis level sensor 407 and sent to microprocessor 901. Microprocessor 901 may in turn send signals to on-axis control motor 303 to adjust the on-axis level of the inner frame system according to an out-of-level measurement provided by on-axis level sensor 407.

Circuit 900 may also include one or more input mechanisms 105, transceiver 907, line control encoder 227, and line control motor 223. Input regarding a desired line position may be received from input mechanisms 105 or transceiver 907 (i.e., signals from a remote control unit). The input regarding the line position change may be processed by microprocessor 901 in conjunction with knowledge from encoder 227 regarding how much to actuate line control motor 223 to effect the desired line position. The processor then sends the appropriate signal to line control motor 223 to perform the calculated actuation. In some embodiments, in order to display the current line position of the reference laser beam, microprocessor 901 may receive information from encoder 227 regarding any previous movement of line control motor 223 (i.e., its current status). This information may be used to calculate the current line position and send it to a display.

Circuit 900 may also include grade control encoder 221, and grade control motor 219. Input regarding a desired grade may be received from input mechanisms 105 or transceiver 907 (i.e., signals from a remote control unit). The input regarding the grade change may be processed by microprocessor 901 in conjunction with knowledge from encoder 221 regarding how much to actuate grade control motor 219 to effect the desired grade. The processor then sends the appropriate signal to grade control motor 219 to perform the calculated actuation. In some embodiments, in order to display the current grade of the reference laser beam, microprocessor 901 may receive information from encoder 221 regarding any previous movement of line control motor 219 (i.e, its current status). This information may be used to calculate the current grade and send it to a display.

In some embodiments, circuit 900 may include an SPI program port 909 for loading and updating software. In some embodiments, circuit 900 may include an RS232 port 911 for use as a diagnostic connection point for use in field or dealer servicing.

The invention also provides a pipe laser with a bi-directional remote control unit. As illustrated in FIG. 9, pipe laser 100 may include a transceiver 907. In some embodiments, transceiver 907 may comprise a radio frequency (RF) transceiver that both sends and receives instructions/data via radio waves. The use of RF communication may enable communication with a remote control unit that is not limited by "line of sight." In some embodiments, transceiver 901 may comprise a RF transceiver using Zigbee™ technology. Other types of transceivers (e.g., Bluetooth™ enabled transceivers), including those not using RF communication may be used.

Figure 10:
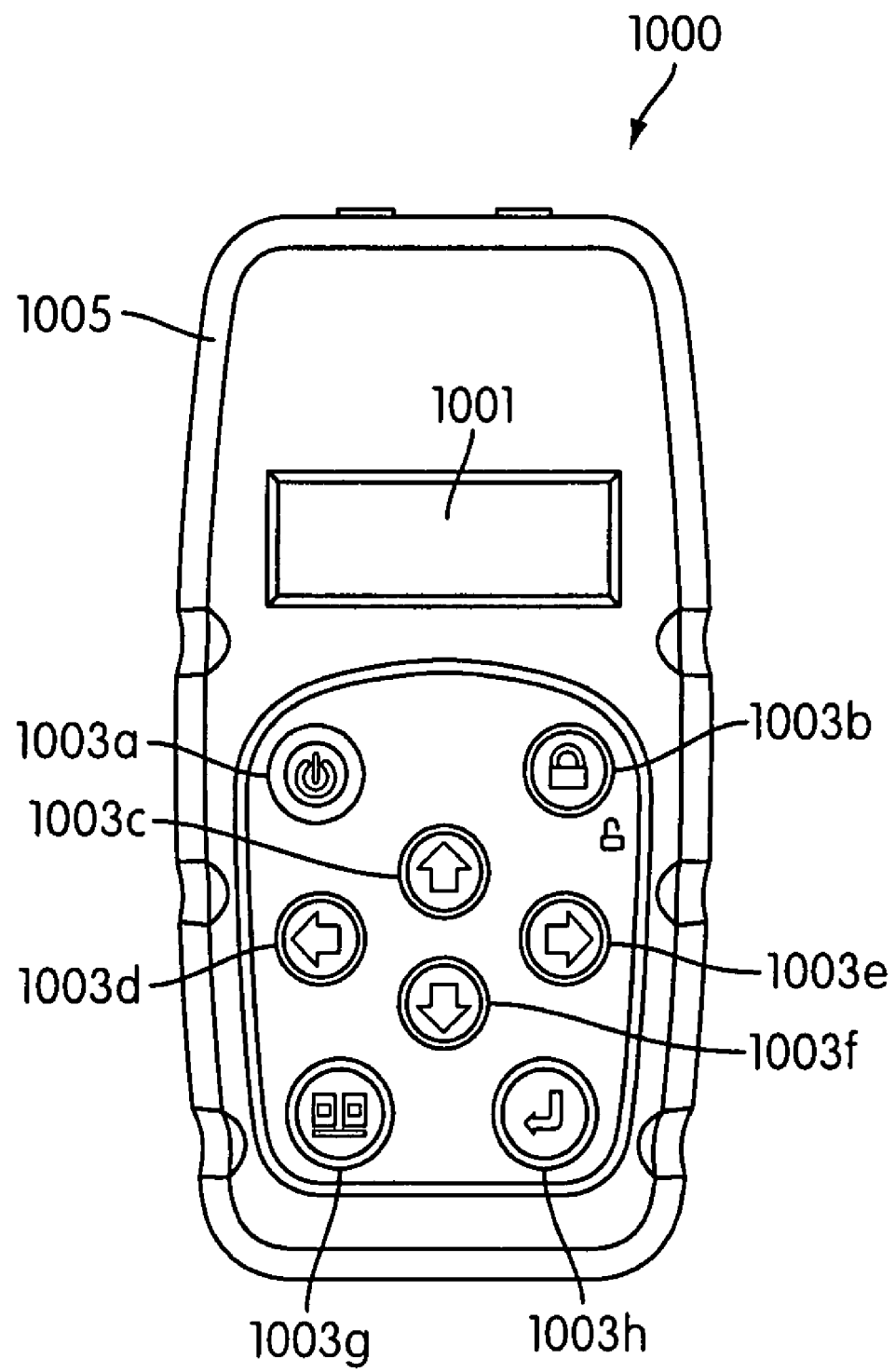
FIG. 10 illustrates an example of a remote control unit for a pipe laser, according to an embodiment of the invention.

Transceiver 907 may be used to enable bi-directional communication to the remote control unit. FIG. 10 illustrates a remote control unit 1000 for use with pipe laser 100. Remote control unit 1000 include a display 1001, a plurality of input mechanisms 1003a-1003h, a housing 1005, and/or other elements. Other configurations and/or additional displays or input mechanisms may be included.

Remote control 1000 may enable bi-directional communication with pipe laser 100 (i.e., the remote control may send data to and receive data from the pipe laser unit). As such, remote control 1000 may also include a transceiver (not illustrated) that is capable of communicating with transceiver 907 of pipe laser 100. Both transceiver 907 and the remote control transceiver may be "addressable," that is, they may each be programmable to communicate with transceivers, transmitting elements, or receiving elements, having a certain address (which may be a simple numerical indicator or which may be indicative of a certain communication frequency). For a certain remote control unit to communicate with a certain pipe laser unit, the respective transceivers must be programmed to the same address. Furthermore, the pipe laser and remote control units of the invention may have selectable addressability, as described below. This selectable addressability feature of the pipe laser and remote control units enables a single pipe laser to be controlled using multiple remote controls and enables a single remote control to control multiple pipe lasers. It also enables multiple users and multiple remotes to be used in proximity with one another without interference. This configurability enables versatile interoperability between multiple remote control units and multiple pipe laser units that may be advantageous on a job site.

FIG. 10 illustrates an example configuration of 8 input mechanisms 1003. For example, input 1003a may comprise an on/off switch that turns the power of pipe laser 100 on or off. Input 1003b may include a key lock control, by which one or both of input mechanisms 105 and input mechanisms 1003 may be locked and unlocked to prevent accidental disruption of pipe laser operation. Inputs 1003c-1003f may include directional arrows that may be used to scroll through menus, to indicate/select grade or line control settings, and or to perform other functions. In some embodiments, an input 1003g ("menu") may be used to view various menu selectable items such as, for example, battery strength of one or both of remote control unit battery strength, pipe laser unit battery strength, and/or other menu items. Input 1003h may function as an "enter" key that serves to select items set or chosen using other input mechanisms (e.g., inputs 1003c-1003f) or may perform other functions. Other input mechanisms and/or other configurations thereof may be used.

It should be noted that some or all of the features and functions described for display 1001 and input mechanisms 1003a-1003h of remote control unit 1000 may also apply to display 103 and input mechanisms 105 of pile laser 100 (illustrated in FIG. 1).

Figure 11A:
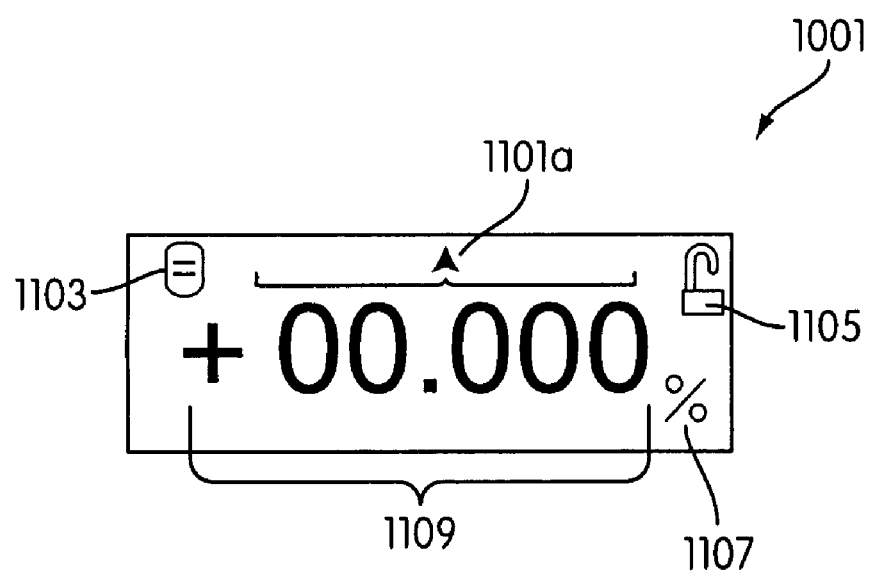
FIGS. 11A, 11B, 12A-12E, and 13 illustrate examples of a display interface, according to an embodiment of the invention.
Figure 11B:
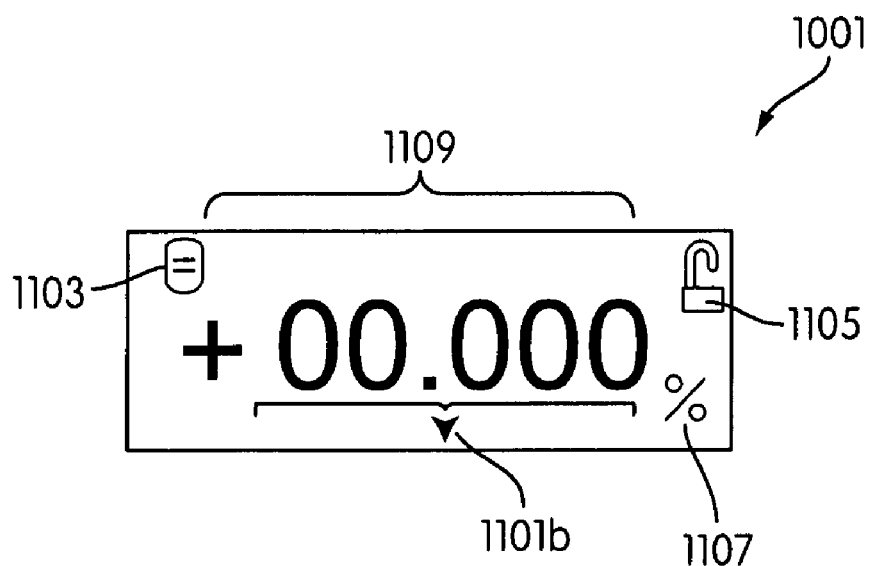

FIGS. 11A and 11B illustrate an example of information that may be displayed on display 1001 of remote control unit 1000. FIGS. 11A and 11b illustrate that display 1001 may include a measurement indicator 1109. In some embodiments, measurement indicator 1109 may display an actual grade or line position measurement (e.g., the grade at which the laser reference beam exists—or would exist if the laser power were turned on without further adjustment. The example of FIGS. 11A and 11B displays a +00.000% grade (which is the same as a −00.000% grade). In some embodiments, measurement indicator 1109 may also display a desired/selected grade or line position measurement. For example, a user may use the various input mechanisms 1003 to select a particular grade at which the reference laser is to be set. This desired grade may be displayed on measurement indicator 1109 prior to the pipe laser actually reaching the desired grade.

Display 1001 of FIGS. 11A and 11B may also include an orientation indicator 1101 that indicates a selected orientation between the pipe laser unit and a user operating the remote control unit. This orientation may affect the function of the use of inputs 1003c-1003f to indicate line control or other controls. For instance, if inputs 1003d and 1003e are functional to indicate the direction of a line control adjustment left or right, and orientation indicator 1101 indicates that the user is facing the front end of the pipe laser (the end where the reference laser beam exits the housing), use of input 1003d tells pipe laser 100 to adjust the line position of the reference laser to the user's left (if the user is indeed facing the front end of the pipe laser), but the pipe laser's right. If orientation indicator 1101 indicates that the user is facing the rear end of the pipe laser, then input from 1003d tells pipe laser 100 to adjust the line position of the reference laser beam to the users left (if the user is indeed facing the pipe laser's rear end) and the pipe laser's left. As discussed below, the indicated orientation between the user and the pipe laser may be changed using one or menus.

Display 1001 of FIGS. 11A and 11B may include a signal strength indicator 1103 that indicates the strength of the signal (e.g., the RF signal) to and from the pipe laser (e.g., the number of "bars"). For example, commands sent to the pipe laser are not performed or not performed properly, the existence of a weak signal strength may be to blame. Display 1001 of FIGS. 11A and 11B may also include a input mechanism lock indicator 1105. Input mechanism lock indicator 1105 may indicate whether one or both of input mechanisms 105 or 1003 are locked or unlocked. Finally, display 1001 of FIGS. 11A and 11B may include a measurement unit indicator 1107, which indicates the units of measurement in which the values displayed in measurement indicator 1009 are displayed. The example of FIGS. 11A and 11B show a measurement unit of percent grade (% grade). A 1% grade indicates one foot of rise over 100 ft or run. In some embodiments, a per mil grade (0/00 grade) unit may be used. A 1 per mil grade indicates a one foot rise over a 1000 foot run. Other grade units such as, for example, degrees, radians, grads, gons, and/or other grade units may be used. Additionally, as described below, if various units of display are available (e.g., percent versus per mil), one unit may be selected over the other using one or more menus of the display.

Figure 12A:
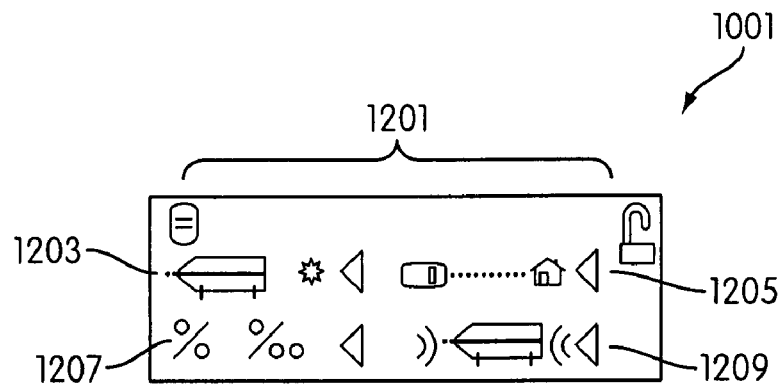
Figure 12B:
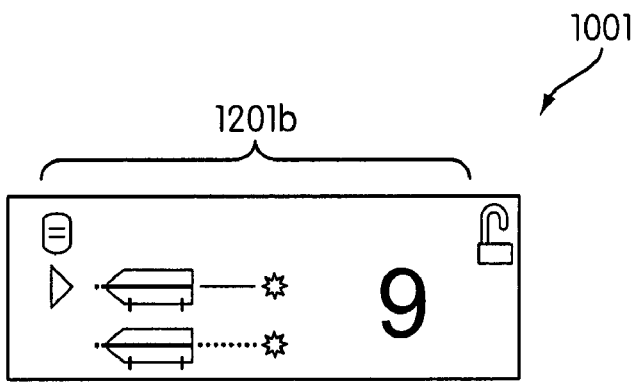
Figure 12C:
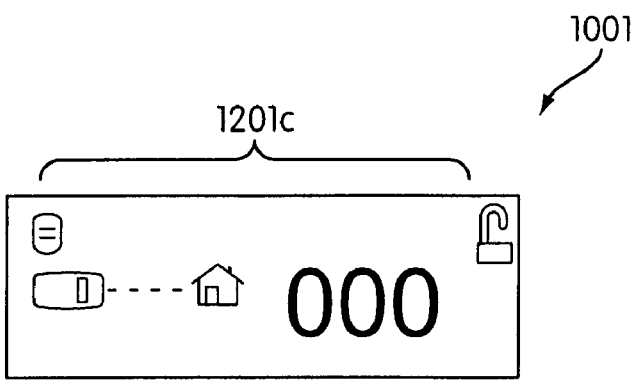
Figure 12D:
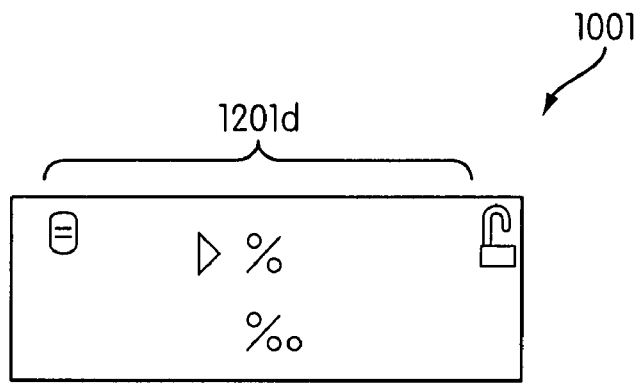
Figure 12E:
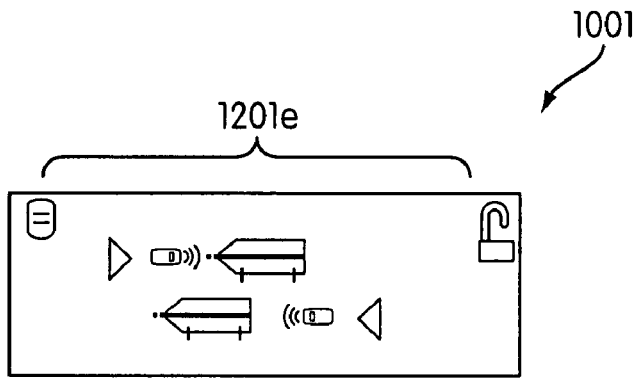

FIG. 12A illustrates an example of display 1001 that includes a menu 1201a for selecting various features of pipe laser 100. Menu 1201a may include a list of items through which a user may scroll to select one or more features. For example, as illustrated in FIG. 12a, a user may select an option 1203, which brings a user to a menu 1201b (illustrated in FIG. 12B) for adjusting the laser power of the reference laser beam. In some environments (e.g., low light, high light) users may want/need to adjust the laser power of the reference laser beam. A user may also select an option 1205, which brings the user to a menu 1201c (illustrated in FIG. 12C) for selecting the address of the remote control unit (a corresponding menu may exist on pipe laser 100 to select the address of pipe laser 100). A user may also select an option 1207, which brings the user to a menu 1201d (illustrated in FIG. 12D) for selecting the units of measurement displayed by measurement indicator 1109. A user may also select an option 1209, which brings the user to a menu 1201e (illustrated in FIG. 12E) for choosing the orientation between a user and pipe laser 100. As described above, the indicated orientation of the user and the pipe laser may affect certain control functions provided by inputs 1003. Other methods for selecting these and other functions may be employed.

Figure 13:
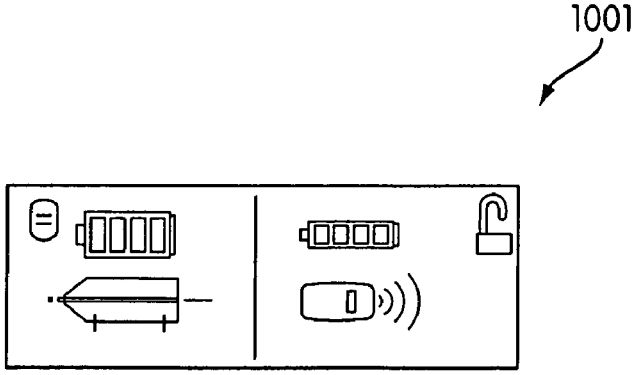

Display 1001 may provide other features and functions. For example, FIG. 13 illustrates an example display 1001 wherein the battery strength of both remote control unit 1000 and pipe laser 100 may be displayed.

Figure 14:
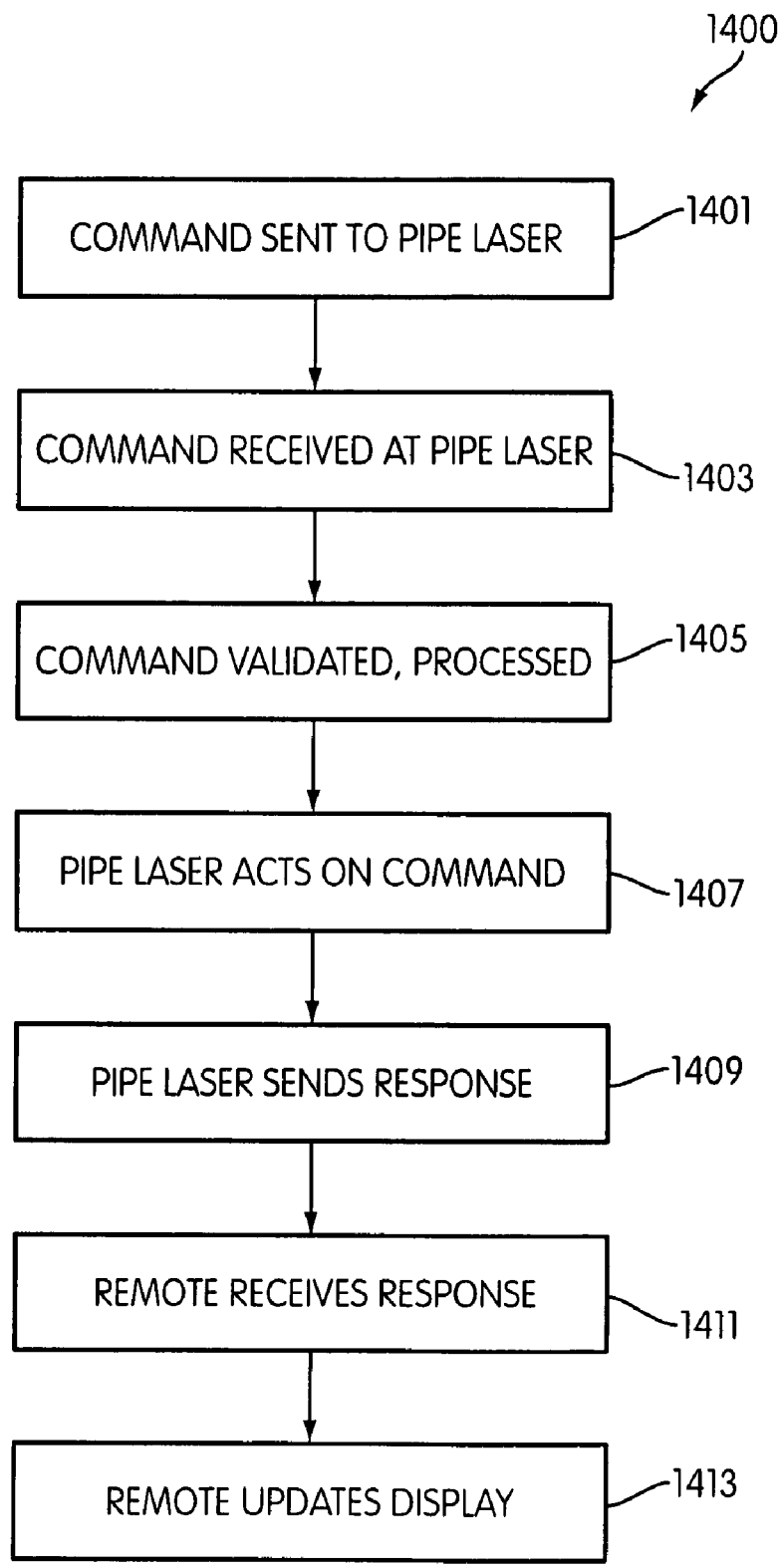
FIG. 14 illustrates an example of a process for operating a pipe laser, according to an embodiment of the invention.

As described herein, communication between remote control unit 1000 and pipe laser 100 may be bi-directional. This bi-directionality enable numerous features of the remote controlled pipe laser of the invention. For instance, FIG. 14 illustrates a process 1400, which is an example of a process wherein the bi-directionality of remote control unit 1000 and pipe laser 1000 may be utilized. Process 1400 includes an operation 1401, wherein a remote control unit 1000 sends a command to pipe laser 1000 via the remote control's transceivers.

In an operation 1403, pipe laser 100 receives the command via transceiver 907. In an operation 1405, the command is passed to microprocessor 901, which performs any necessary validation and/or calculations and sends appropriate signals to the appropriate elements of pipe laser 100 to act upon the command. In some embodiments, validation of a command may include a logical check to see if the pipe laser is capable of acting on the command. For example, if pipe laser had a maximum grade setting of 30% and the grade were already set at a 25% grade, a command to increase the grade 10% would not be validated.

In an operation 1407, the command may be acted upon by the appropriate elements of pipe laser 100 (e.g., if the command were to go to a certain grade, the grade adjustment mechanism may act on the command). In an operation 1409, pipe laser 100 sends a response to the command to remote control 1000 from transceiver 907 to remote control 1000. In an operation 1411, remote control 1000 receives its response at its transceiver. In an operation 1413, the display of remote control 1000 may be updated according to the response. In some embodiments, the response may cause remote control to update its display to indicate that the command was received and acted upon. In some embodiments, an indication that the command was acted upon may include remote control 1000 displaying the commanded grade when the commanded grade is reached. In some embodiments, the response may indicate a progression of action upon the command (e.g., as the grade adjustment mechanism adjusts the grade, the display of remote control 1000 may show a progression through the grade adjustment. In some embodiments, the response may simply acknowledge that the command was received by sending the command back to remote control 1000. In some embodiments, if no response was received, remote control 1000's display may indicate that no response was received by, for example, displaying dashes.

In some embodiments, process 1400 may be used to set a new grade for a reference laser beam of pipe laser 100. The user may utilize the remote control to set a new/desired grade by indicating the desired grade on the display of remote control unit 1000. The command including the desired grade is then sent to pipe laser 100. Before, during or, after pipe laser 100 acts to set the desired grade, the received grade setting may be sent back to remote control unit 1000 and displayed thereon.

In some embodiments, the user may not select a specific desired grade but use up and down arrows (or other input mechanisms) to instruct pipe laser 100 to incrementally adjust the grade until a desired grade is reached (e.g., a rolling grade adjustment). As the incremental commands are received and acted upon at pipe laser 100, incremental updates are sent to remote control 1000 and the display is updated as the grade is adjusted. In some embodiments, if the "up" or "down" arrows (e.g., 1003c, 1003f) hare held down continuously, the grade will adjust/update faster.

In some embodiments, process 1400 may be used to set a new line position for a reference laser beam of pipe laser 100. The user may utilize the remote control to set a new/desired line position by entering the desired line position using side arrows 1003d or 1003e on the display on remote control unit 1000. The command including the desired line position is then sent to pipe laser 100. Before, during or, after pipe laser 100 acts to set the desired line position, the received line position setting may be sent back to remote control unit 1000 and displayed thereon. In some embodiments, there may be no formal measurement units for line position. In some embodiments, line position may be indicated by movement of orientation indicator 1101a or 1101b left or right along display 1001.

In some embodiments, the user may not select a specific desired line position but use left and right arrows (or other input mechanisms) to instruct pipe laser 100 to incrementally adjust the line position until a desired grade is reached (e.g., a rolling line position adjustment). As the incremental commands are received and acted upon at pipe laser 100, incremental updates are sent to remote control 1000 and the display is updated as the line position is adjusted. In some embodiments, if the "left" or "right" arrows (e.g., 1003d, 1003e) hare held down continuously, the line position will adjust/update faster.

In some embodiments if specific input mechanisms of remote 1000 are actuated, the laser will automatically set the grade and/or line position to zero. For example, a command to set zero grade may include a user pushing the up and down arrows at the same time. Similarly, a command to set the line position to center, may include a user pushing the left and right arrows at the same time. These commands are sent to pipe laser, where they are processed and acted upon. Responses are sent to remote control 1000, and the display is updated.

In some embodiments, pipe laser 100 may send status and/or position information to the remote control immediately after pipe laser 100 is powered on (e.g., turned on), regardless of whether the remote control is on or not (or operating at the same address). Similarly, when remote control unit 1000 is powered on, it requests status and/or position information from pipe laser 100. In some embodiments, status information may include the current the battery power status of pipe laser 100, the orientation with user setting, the address used, the laser power, the temperature of the air (or other material) surrounding the pipe laser, error information, input mechanism lock status, sleep status (if left unattended, pipe laser may have a sleep function which conserves battery life), and/or other status information. In some embodiments, position information may include the current grade setting, the current line control position, and/or other information.

In some embodiments, status and/or position information may be sent to remote control 1000 from pipe laser 100 at a predetermined interval (e.g., every 15 seconds) or upon request from a user at the remote control. In some embodiments, if environmental status changes take place (e.g., battery power drain, temperature change) or settings are changed at the pipe laser (e.g., using input mechanisms 105 on pipe laser 100), updates are sent to remote control unit 1000. As used herein, the specific status and/or position information sent and/or requested may be a subset of the total set of available status or position information available.

In one embodiment, if remote control unit 1000 is unable to successfully get commands/requests to pipe laser 100, then pipe laser 100 ceases to send updates/responses to remote control unit 1000.

It should be appreciated that the remote control system disclosed herein for two-way communication can be used with more conventional pipe lasers and is not dependent on the improved cross-axis and leveling arrangements disclosed herein. Conversely, the improved auto-leveling features disclosed herein can be used without a remote control or with a conventional remote control rather than the improved remote control features disclosed herein.

While the invention has been described with reference to the certain illustrated embodiments, the words that have been used herein are words of description, rather than words of limitation. Changes may be made, within the purview of the associated claims, without departing from the scope and spirit of the invention in its aspects. Although the invention has been described herein with reference to particular structures, acts, and materials, the invention is not to be limited to the particulars disclosed, but rather can be embodied in a wide variety of forms, some of which may be quite different from those of the disclosed embodiments, and extends to all equivalent structures, acts, and, materials, such as are within the scope of the associated claims.

What is claimed is:

1. A remote-controlled pipe laser, comprising:
    a laser unit including:
        a laser unit housing;
        a laser source within the laser unit housing that generates a reference laser beam;
        a first transceiver within the laser unit housing that sends and receives data; and
    a remote control unit including
        a remote housing
        a display carried by the remote housing;
        a plurality of input mechanisms; and a second transceiver within the remote housing that receives the data sent by the first transceiver and that sends data to the first transceiver, wherein the second transceiver sends a command to the first transceiver, the laser unit executes the command, and the first transceiver sends a response to the second transceiver;

wherein the command comprises a command to set the reference laser beam at a new grade, execution of the command comprises moving the laser source so as to set the reference laser beam at the new grade and the response comprises confirmation that the reference laser beam is set at the new grade.

2. The pipe laser of claim 1, wherein the first transceiver and the second transceiver are both radio frequency transceivers.

3. The pipe laser of claim 1, wherein data sent between the first transceiver and the second transceiver is sent via radio frequency transmission.

4. The pipe laser of claim 1, wherein the first transceiver sends one or more of status data and laser source position data to the remote control unit when the laser unit is powered on.

5. The pipe laser of claim 4, wherein status data includes one or more of battery level of a battery power source of the laser unit, error information, temperature of air within the laser unit housing, and lock status of a set of input mechanisms carried by the laser unit housing.

6. The pipe laser of claim 4, wherein laser source position data includes one or more of an indication of a grade of the reference laser beam and an indication of a line position of the reference laser beam.

7. The pipe laser of claim 1, wherein the laser unit further includes a display and at least one input mechanism carried by the laser unit housing.

8. The pipe laser of claim 7, wherein user input data is input using the at least one input mechanism of the laser unit and update data is sent from the first transceiver to the second transceiver, the update data relating to the user input data.

9. The pipe laser of claim 1, wherein, the second transceiver sends a request to the first transceiver, and wherein the second transceiver returns a response to the request.

10. The pipe laser of claim 9, wherein the second transceiver sends the request at a predetermined time interval.

11. The pipe laser of claim 10, wherein status data includes one or more of battery level of a battery power source of the laser unit, error information, temperature of air within the laser unit housing, and lock status of a set of input mechanisms located on the laser unit.

12. The pipe laser of claim 10, wherein laser source position data includes one or more of an indication of a grade of the reference laser beam and an indication of a line position of the reference laser beam.

13. The pipe laser of claim 9, wherein the second transceiver sends the request when the remote control is powered on.

14. The pipe laser of claim 9, wherein the request includes one or more of a status request and a laser source position request, and wherein the response comprises one or more of status data and laser source position data.

15. The pipe laser of claim 1, wherein the first transceiver is associated with an address chosen from a plurality of addresses, and wherein the second transceiver is associated with an address chosen from a plurality of addresses.

16. The pipe laser of claim 1, wherein the command to set the reference laser beam at a new grade further comprises a command to set the reference laser beam at a specific grade as measured by a specific unit of measure.

17. The pipe laser of claim 1, wherein the command to set the reference laser beam at a new grade further comprises a command to increase or decrease a current grade of the reference laser beam by one or more increments.

18. A remote-controlled pipe laser, comprising:
a laser unit including:
a laser unit housing;
a laser source within the laser unit housing that generates a reference laser beam;
a first transceiver within the laser unit housing that sends and receives data; and
a remote control unit including
a remote housing
a display carried by the remote housing;
a plurality of input mechanisms; and
a second transceiver within the remote housing that receives the data sent by the first transceiver and that sends data to the first transceiver, wherein the second transceiver sends a command to the first transceiver, the laser unit executes the command, and the first transceiver sends a response to the second transceiver;
wherein the command comprises a command to set the reference laser beam at a new line position, wherein execution of the command comprises moving the laser source so as to set the reference laser beam at the line position, and wherein the response comprises confirmation that the reference laser beam is set at the new line position.

19. The pipe laser of claim 18, wherein the command to set the reference laser beam at a new line position further comprises a command to change a current line position of the reference laser beam by one or more increments.

20. A remote-controlled pipe laser, comprising:
a laser unit including:
a laser unit housing;
a laser source within the laser unit housing that generates a reference laser beam;
a first transceiver within the laser unit housing that sends and receives data; and
a remote control unit including
a remote housing
a display carried by the remote housing;
a plurality of input mechanisms; and
a second transceiver within the remote housing that receives the data sent by the first transceiver and that sends data to the first transceiver, wherein the second transceiver sends a command to the first transceiver, the laser unit executes the command, and the first transceiver sends a response to the second transceiver;
wherein the command comprises one or more of a command to increase or decrease the power of the reference laser beam generated by the laser source, a command to change a unit of measurement in which a grade of the reference laser beam is displayed on the display from a plurality of units of measurement, a command to change an end of the housing from which a user operating the remote control unit is nearest to, and a command to change an address associated with the first transceiver.

21. The pipe laser of claim 20, wherein the plurality of units of measurement include percent grade and per mil grade.

22. A method for operating a remote-controlled pipe laser, wherein the remote-controlled pipe laser includes a laser unit and a remote control unit, the method comprising:
receiving, at the laser unit, a command from the remote control unit;
acting on the command at the laser unit;

sending a response from the laser unit to the remote control unit; and updating a display on the remote control unit based on the response;

wherein the command comprises a command to set a reference laser beam at a new grade, wherein acting on the command comprises moving the laser source so as to set the reference laser beam at the new grade and wherein the response comprises confirmation that the reference laser beam is set at the new grade.

23. The method of claim 22, wherein receiving a command from the remote control unit further comprises validating, at the laser unit, that the command is able to be performed by the laser unit.

24. The method of claim 22, wherein one or more of the command and the response are sent via a radio frequency transmission.

25. The method of claim 22, wherein receiving a command from the remote control further comprises receiving the command at a first transceiver included in the laser unit and wherein sending a response from the laser unit further comprises sending the response from the first transceiver.

26. The method of claim 22, wherein the response sent from the laser unit comprises an indication that the command was received.

27. The method of claim 22, wherein the response sent from the laser unit comprises information relating to the laser unit acting on the command.

28. The method of claim 22, wherein the remote control unit includes a display screen.

29. The method of claim 28, further comprising updating the display based on the response.

30. The method of claim 22, wherein the command comprises a command to set a reference laser beam at a new grade, wherein acting on the command comprises moving the laser source so as to set the reference laser beam at the new grade and wherein the response comprises confirmation that the reference laser beam is set at the new grade.

31. The method of claim 30, wherein the command to set the reference laser beam at a new grade further comprises a command to set the reference laser beam at a specific grade as measured by a specific unit of measure.

32. The pipe laser of claim 30, wherein the command to set the reference laser beam at a new grade further comprises a command to increase or decrease a current grade of the reference laser beam by one or more increments.

33. A method for operating a remote-controlled pipe laser, wherein the remote-controlled pipe laser includes a laser unit and a remote control unit, the method comprising:

receiving, at the laser unit, a command from the remote control unit;

acting on the command at the laser unit;

sending a response from the laser unit to the remote control unit; and updating a display on the remote control unit based on the response;

wherein the command comprises a command to set the reference laser beam at a new line position, acting on the command comprises moving the laser source so as to set the reference laser beam at the line position, and the response comprises confirmation that the reference laser beam is set at the new line position.

34. The pipe laser of claim 33, wherein the command to set the reference laser beam at a new line position further comprises a command to change a current line position of the reference laser beam by one or more increments.

35. A method for operating a remote-controlled pipe laser, wherein the remote-controlled pipe laser includes a laser unit and a remote control unit, the method comprising:

receiving, at the laser unit, a command from the remote control unit;

acting on the command at the laser unit;

sending a response from the laser unit to the remote control unit; and updating a display on the remote control unit based on the response;

wherein the command comprises one or more of a command to increase or decrease the power of a reference laser beam generated by the laser source, a command to change a unit of measurement in which a grade of the reference laser beam is displayed on the display from a plurality of units of measurement, a command to change an end of the housing from which a user operating the remote control unit is nearest to, and a command to change an address associated with the first transceiver.

36. The pipe laser of claim 35, wherein the plurality of units of measurement include percent grade and per mil grade.

* * * * *